United States Patent
Parsons

(10) Patent No.: US 10,969,256 B2
(45) Date of Patent: Apr. 6, 2021

(54) MODULAR, PALLETIZED SYSTEM FOR A DEPLOYABLE SENSOR

(71) Applicant: Platform Aerospace, Inc., Hollywood, MD (US)

(72) Inventor: Kurt Parsons, Hollywood, MD (US)

(73) Assignee: PLATFORM AEROSPACE, INC., Hollywood, MD (US)

( * ) Notice: Subject to any disclaimer, the term of this patent is extended or adjusted under 35 U.S.C. 154(b) by 150 days.

(21) Appl. No.: 16/255,237

(22) Filed: Jan. 23, 2019

(65) Prior Publication Data

US 2020/0025596 A1 Jan. 23, 2020

Related U.S. Application Data

(60) Provisional application No. 62/620,559, filed on Jan. 23, 2018.

(51) Int. Cl.
G01D 11/24 (2006.01)
(52) U.S. Cl.
CPC .................. *G01D 11/245* (2013.01)
(58) Field of Classification Search
CPC ....... G01D 11/245; B64C 1/1415; B64C 1/22; B64D 43/00
See application file for complete search history.

(56) References Cited

U.S. PATENT DOCUMENTS

| | | | |
|---|---|---|---|
| 3,689,012 A | 9/1972 | Liston | |
| 4,114,839 A | 9/1978 | Sibley et al. | |
| 4,162,776 A | 7/1979 | Sibley et al. | |
| 4,746,082 A | 5/1988 | Syms et al. | |
| 5,191,370 A | 3/1993 | Bozzolato | |
| 5,531,403 A | 7/1996 | Tyler | |
| 5,918,834 A | 7/1999 | Sommer et al. | |
| 5,927,648 A | 7/1999 | Woodland | |
| 6,422,508 B1 | 7/2002 | Barnes | |
| 6,616,097 B2 | 9/2003 | Hilbert | |
| 7,387,276 B1 * | 6/2008 | Smith | B64C 1/1415 244/1 R |
| 7,726,604 B1 | 6/2010 | Smith et al. | |
| 7,726,605 B1 | 6/2010 | Smith et al. | |

(Continued)

FOREIGN PATENT DOCUMENTS

| | | |
|---|---|---|
| DE | 3417917 | 11/1985 |
| WO | 2008/111948 | 9/2008 |

*Primary Examiner* — Xin Y Zhong
(74) *Attorney, Agent, or Firm* — Whiteford, Taylor & Preston, LLP; Gregory M. Stone

(57) ABSTRACT

Disclosed is a modular, palletized system for a deployable sensor that provides for easy deployment with minimal interconnection to the vehicle carrying such system, and with no requirement for modification to the vehicle carrying such system. A pallet having a standardized construction for fitment onto a pallet-carrying portion of a vehicle carries a moveable carriage. The carriage in turn carries an arm and sensor head which may be moved through an opening in the vehicle (such as through the door of an airborne aircraft) and pivoted to deploy the sensor when intended for use, and to retract the sensor when such use is completed. As the system is specifically sized for fitment on a standard pallet profile, it may be installed on the pallet-carrying portion of such vehicle without need for retrofitting of the vehicle's body.

16 Claims, 21 Drawing Sheets

(56) References Cited

U.S. PATENT DOCUMENTS

| | | |
|---|---|---|
| 7,806,368 B1 | 10/2010 | Smith et al. |
| 8,635,938 B2 | 1/2014 | King et al. |
| 8,654,314 B2 | 2/2014 | King et al. |
| 8,657,230 B2 | 2/2014 | Woodland et al. |
| 8,807,482 B2 | 8/2014 | Woodland et al. |
| 8,882,046 B2 | 11/2014 | Edsall et al. |
| 9,393,686 B1 | 7/2016 | Bradski et al. |
| 9,452,834 B2 | 9/2016 | Woodland et al. |
| 2003/0071170 A1* | 4/2003 | Hilbert .................. B64D 47/08 244/118.1 |
| 2005/0029398 A1 | 2/2005 | Lowe et al. |
| 2010/0206988 A1 | 8/2010 | Woodland |
| 2010/0206992 A1 | 8/2010 | Woodland et al. |
| 2010/0219295 A1 | 9/2010 | Dias Ferraz |
| 2013/0048792 A1* | 2/2013 | Szarek .................. F16M 11/18 244/175 |
| 2013/0206914 A1 | 8/2013 | Edsall et al. |

* cited by examiner

MODULAR, PALLETIZED SYSTEM FOR A DEPLOYABLE SENSOR

CROSS-REFERENCE TO RELATED APPLICATIONS

This application claims the benefit of U.S. Provisional Application No. 62/620,559 titled "Modular, Palletized System for a Deployable Sensor," filed Jan. 23, 2018, which application is incorporated herein by reference in its entirety.

FIELD OF THE INVENTION

The present invention relates generally to deployable sensor systems, and more particularly to a palletized, modular, vehicle-born sensor system configured for easy deployment from such vehicle and installation on such vehicle without modification of the vehicle structure.

BACKGROUND OF THE INVENTION

Vehicle-borne sensors, and more particularly aerial sensors, are used for a wide variety of applications. For example, sensor platforms may be deployed on aircraft for military and civilian purposes, such as the C-130 aircraft, such as for purposes of surveillance, targeting, chemical detection, weather monitoring, and a wide variety of other applications. Providing such airborne sensor platforms can significantly extend the range for monitoring or detecting a particular condition well beyond capabilities afforded by many ground-based sensor systems.

However, challenges exists in the deployment and use of such airborne sensor systems. For example, while certain aircraft may be readily able to carry a sensor platform of a particular configuration, outfitting of the aircraft with such a sensor system can be a time intensive process, creating significant challenge in emergency situations. Moreover, such sensor systems typically carry highly sensitive equipment that may quite easily loose calibration when subjected to vibrations or shocks as may be encountered in routine flights of the aircrafts that carry them. Even further, while many of such sensors must be calibrated for proper or at least optimal use, such through bore-sighting of an aircraft mounted laser or the like, such calibration when the aircraft is in flight can be a significant challenge. More particularly, as it is desirable to provide such sensors with as wide a view as possible, in use they will often deploy to a position that locates the sensor itself below the bottom of the fuselage of the aircraft. With such sensor platforms, carrying out calibration of such sensors on the ground is typically not an option, as deploying the sensor platform to its use position when the aircraft is on the ground would have the sensor impact the ground due to insufficient clearance between the bottom of the fuselage and the ground.

Therefore, there remains a need in the art for a vehicle-born sensor system, such as an aerial sensor system carried by an aircraft and deployed from the aircraft during flight, that is easily installed onto and removed from the aircraft so as to allow varied sensors to be deployed for varying missions, that is sufficiently robust so as to be able to withstand the vibrations and shocks typically experienced during flight operations, and that allows for ground-based calibration, such as bore-sighting, of the sensor platform without damage to the sensor platform.

SUMMARY OF THE INVENTION

Disclosed herein is a modular, palletized, deployable sensor system configured for easy roll-on/roll-off installation and removal from a vehicle such as an aircraft. The system includes a pallet sized and otherwise configured for removable placement on a deck on the interior of an aircraft. A tray system is affixed to the pallet, which tray system carries a moveable carriage that moves a pivotable arm and sensor head toward and away from a door in the fuselage of the aircraft. The sensor head is mounted to the arm along an angled interface that allows angular displacement of the sensor head with respect to the arm that carries it, which significantly aids in ground-based bore sighting of instruments within the sensor head. A pivot assembly is carried by the moveable carriage that pivots the arm and sensor head into position after moving them outside of the aircraft, and holds them in such position in a manner that ensures that a natural frequency of the arm and the sensor head does not fall below 20 Hz (thus maintaining the stability of the arm and sensor head assembly during use in flight operations). A wire guide is also provided between the tray system and a pallet-mounted control console, which wire guide controls the paths of cables extending form the console ultimately to the sensor head.

In accordance with certain aspects of a particular embodiment, a deployable sensor system is provided, comprising: a pallet; a moveable carriage moveably mounted on the pallet; an arm having a first arm end adjacent the moveable carriage and a second arm end opposite the first arm end and defining a longitudinal axis extending from the first arm end to the second arm end; and a sensor head rotatably mounted to the second arm end and defining a second longitudinal axis extending from the arm to a distal end of the sensor head; wherein the sensor head is rotatable with respect to the arm to change an orientation of the first and second longitudinal axes from collinear to angled.

BRIEF DESCRIPTION OF THE DRAWINGS

The accompanying drawings, which are included to provide further understanding of the invention and are incorporated in and constitute a part of this specification, illustrate embodiments of the present invention and together with the below description, serve to explain the principles of the invention.

DETAILED DESCRIPTION OF THE PREFERRED EMBODIMENTS

The invention may be understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Figure 1:
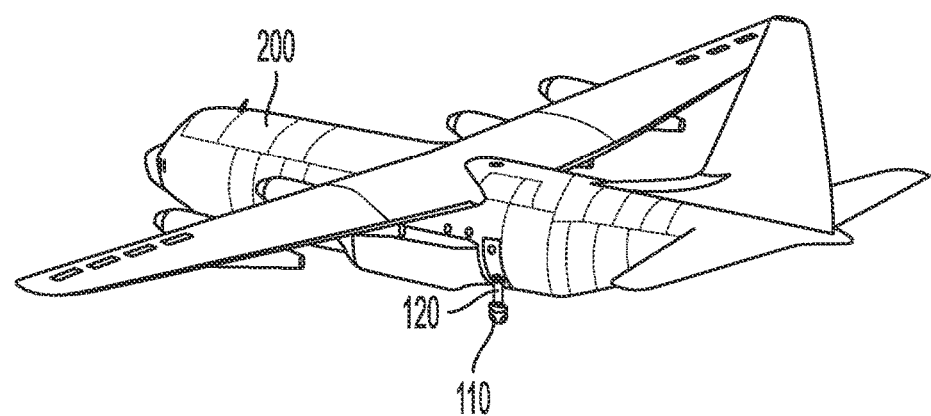
FIG. 1 is a perspective view of an aircraft employing a deployable sensor system in accordance with certain aspects of an embodiment of the invention.
Figures 2, 3:
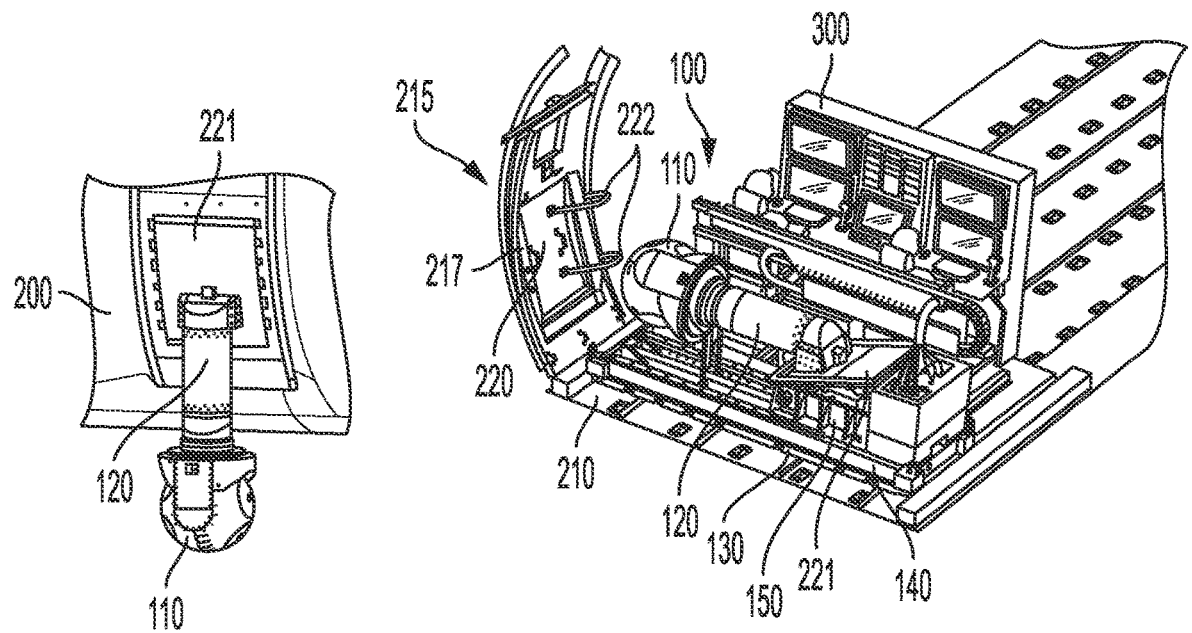
FIG. 2 is a close-up perspective view of the deployable sensor of FIG. 1.
FIG. 3 is a side perspective view of a deployable sensor system installed inside of an aircraft in accordance with certain aspects of an embodiment of the invention.

Disclosed herein is a modular, palletized, roll-on/roll-off system for a deployable sensor that provides for easy deployment with minimal interconnection to the vehicle carrying such system, and with no requirement for modification to the vehicle carrying such system. As shown in FIGS. 1 and 2, a system in accordance with certain aspects of an embodiment provides for a deployable sensor head 110 mounted to the end of a moveable arm 120, which in use extends through the fuselage of an aircraft 200, and more particularly through an opening in a door panel of the aircraft 200. The sensor head 110, when fully deployed, extends downward from the opening in the door panel of the aircraft 200 preferably by a sufficient distance to provide a wide field of view, and more preferably a 360° view, without being blocked by any part of the aircraft's fuselage. In such position, moveable arm 120 is generally vertical with respect to the aircraft's fuselage (i.e., oriented such that a major axis extending through the length of arm 120 is perpendicular to a major axis extending from the front end to the back end of the aircraft), with the portion of arm 120 closest to sensor head 110 being similarly vertically aligned with the rest of arm 120.

Figure 4:
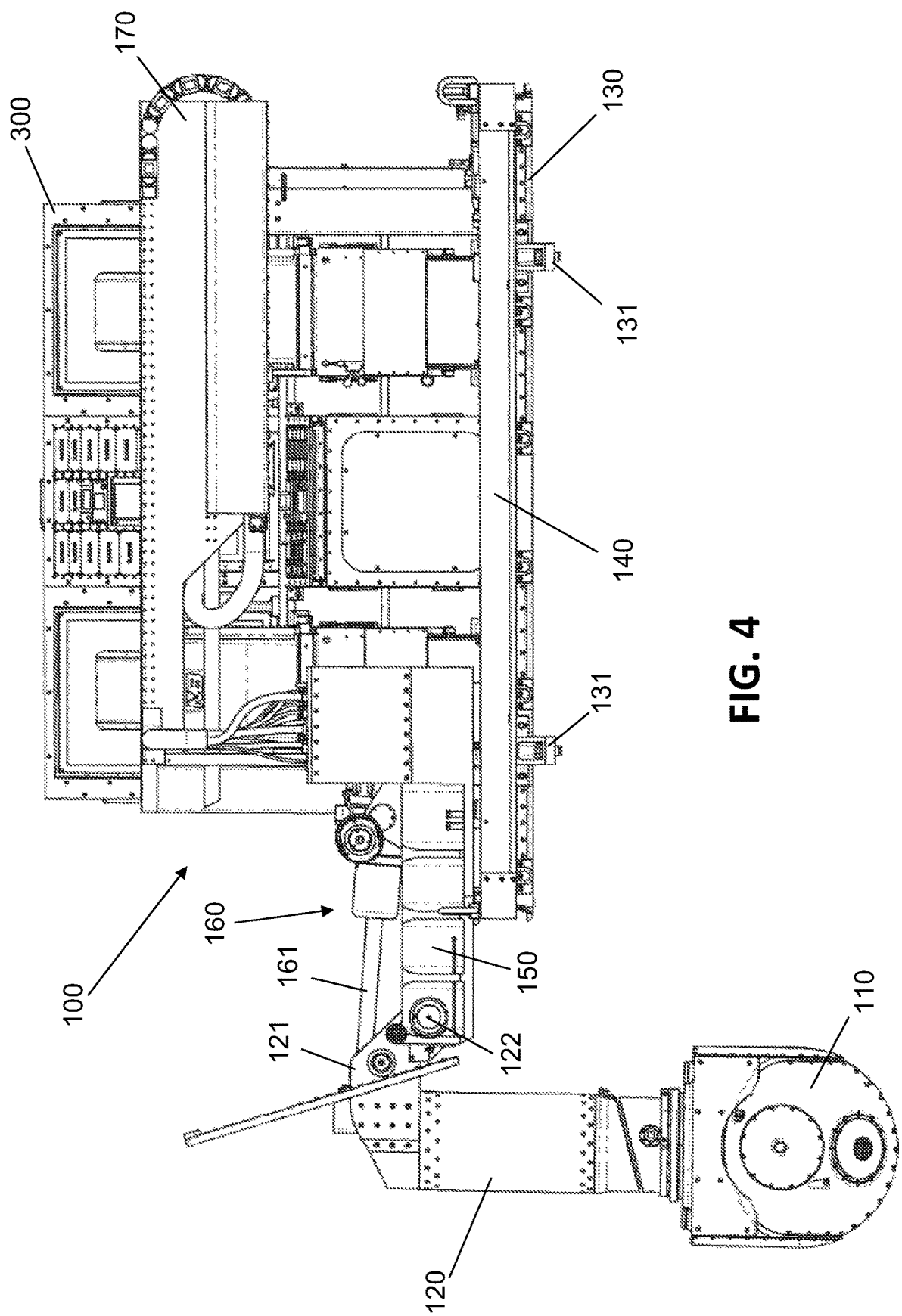
FIG. 4 is a close-up, rear view of the deployable sensor system.
Figure 5:
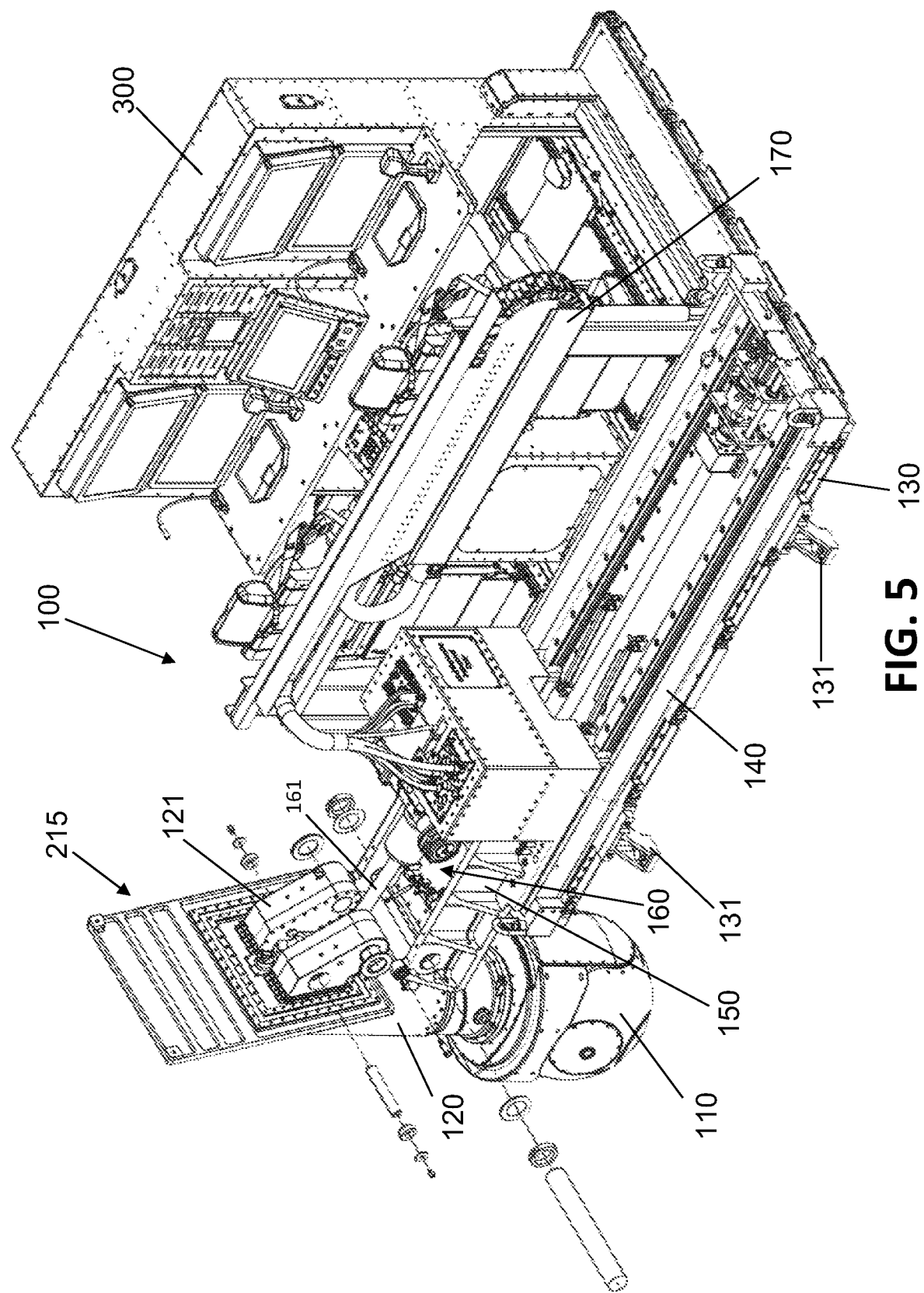
FIG. 5 is detailed, partially exploded perspective view of the deployable sensor system.

FIG. 3 shows a modular, palletized, deployable sensor system 100 in accordance with certain aspects of an embodiment of the invention including sensor head 110 and arm 120 as described above and positioned on the interior deck 210 of aircraft 200. Likewise, FIG. 4 shows a close-up rear view of deployable sensor system 100 with sensor head 110 in the fully deployed position, and FIG. 5 shows a detailed, partially exploded perspective view of deployable sensor system 100 with sensor head 110 in the fully deployed position. While the following elements of system 100 are described in greater detail below, by way of summary the major components of such system include sensor head 110, arm 120, a pallet 130 mounted to the deck 210 of aircraft 200, and a tray system 140 mounted to the pallet 130, which tray system 140 moveably mounts a moveable carriage 150 to move sensor head 110 and arm 120 toward its deployed position and back to its stowed position. A door system (shown generally at 215) seals the interior of aircraft 200 when sensor system 100 is stowed and not in use (as shown in FIG. 3), and allows sensor head 110 and arm 120 to extend through when deployed. In this configuration when intended for use, door system 215 may be opened, and sensor head 110 and arm 120 may be moved through door system 215 from its stowed position (shown in FIG. 3) to its deployed position (shown in FIGS. 1 and 2). In that deployed position, sensor head 110 (which may by way of non-limiting example comprise a camera system, a radiation detection system, an infrared system, or such other sensor systems as may occur to those skilled in the art) may be employed to perform its intended function and collect the intended data. After use, the sensor head 110 and arm 120 may be retracted back into the fuselage of aircraft 200, door system 215 may be closed, and flight operations may continue as normal.

With continuing reference to FIGS. 3-5, deployable sensor system 100 is mounted on a base 130, such as a pallet that provides a base on which the entire deployable sensor system 100 is mounted, thus providing a ready roll-on/roll-off function for quick and easy installation and removal from an aircraft. In certain configurations, pallet 130 may comprise a 463L type air cargo handling pallet, which provides a ready-to-install base for fixed positioning on the deck 210 of an aircraft 200, such as a C130 aircraft deck, and which provides a ready roll-on/roll-off capability for easy installation and removal of the entire deployable sensor system 100. Brackets 131 for use in attaching a 463L pallet to the deck of a C130 (and which are of known configuration) are provided to fix deployable sensor system 100 to deck 210 once pallet 130 is properly positioned within the aircraft fuselage. For example, brackets 131 allow pallet 130, and thus all of deployable sensor system 100, to be bolted or otherwise rigidly affixed to the body of the aircraft 200, and more particularly to deck 210 within the fuselage of aircraft 200.

Mounted at the rear edge of pallet 130 (i.e., the portion of pallet 130 closest to the rear of aircraft 200) is tray system 140. As discussed in greater detail below, tray system 140 moveably mounts moveable carriage 150 for lateral movement (i.e., side to side movement with respect to deck 210 on which pallet 130 is positioned) from a stowed position (shown in FIG. 3) to a deployed position (shown in FIGS. 4 and 5). Moveable carriage 150 in turn carries arm 120 and sensor head 110, such that as moveable carriage 150 moves toward its deployed position, sensor head 110 and arm 120 extend outward through door system 215 toward their deployed position. Moveable carriage 150 also carries a pivot assembly (shown generally at 160) that pivots arm 120 and sensor head 110 from the generally horizontal, stowed position of FIG. 3 to the generally vertical, deployed position of FIGS. 4 and 5. Pivot assembly 160, as discussed in greater detail below, includes an extensible shaft 161 that is pivotably mounted to moveable carriage 150, and that joins to arm 120 at a pivot knuckle 121 so that extension of shaft 161 pivots arm 120 and sensor head 110 at pivot knuckle 121 downward toward their deployed position, and so that retraction of shaft 161 pivots arm 120 and sensor head 110 at pivot knuckle 121 upward toward their stowed position. Additionally, pallet 130 carries instrumentation and control consoles 300 that may include all controls necessary for operating deployable sensor system 100, and preferably operator stations (including seats), all positioned at the forward side of pallet 130 (best shown in FIG. 5). Also as discussed in more detail below, a wire guide 170 is positioned on pallet 130 between tray system 140 and instrumentation and control consoles 300, which wire guide 170 directs a length of wires from instrumentation and control consoles 300 to moveable carriage 150 for data communication as moveable carriage 150 moves from its stowed to its deployed position, and vice versa.

Figure 6:
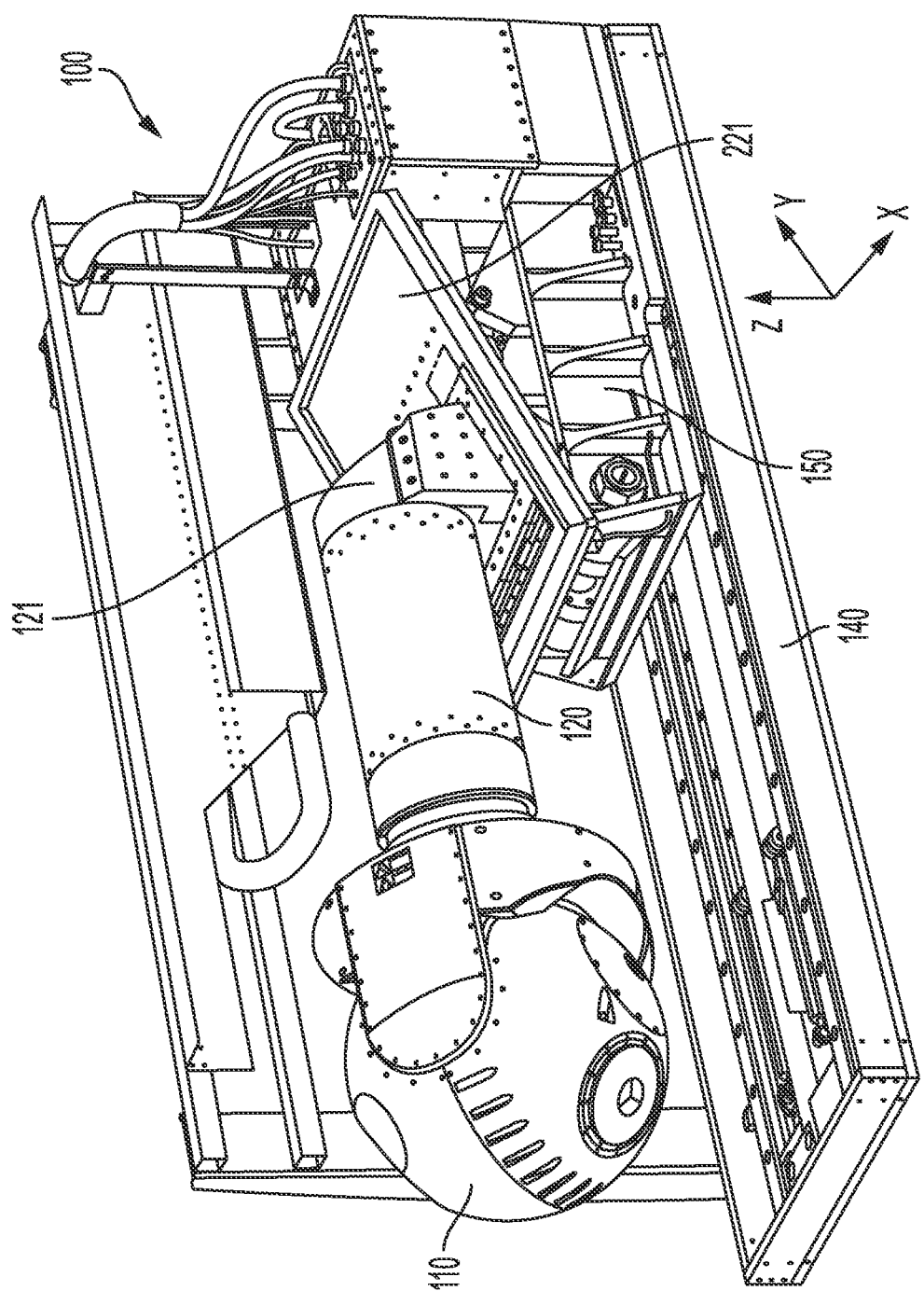
FIG. 6 is a perspective view of a sensor head, arm, and moveable carriage of a deployable sensor system in a stowed position.
Figure 7:
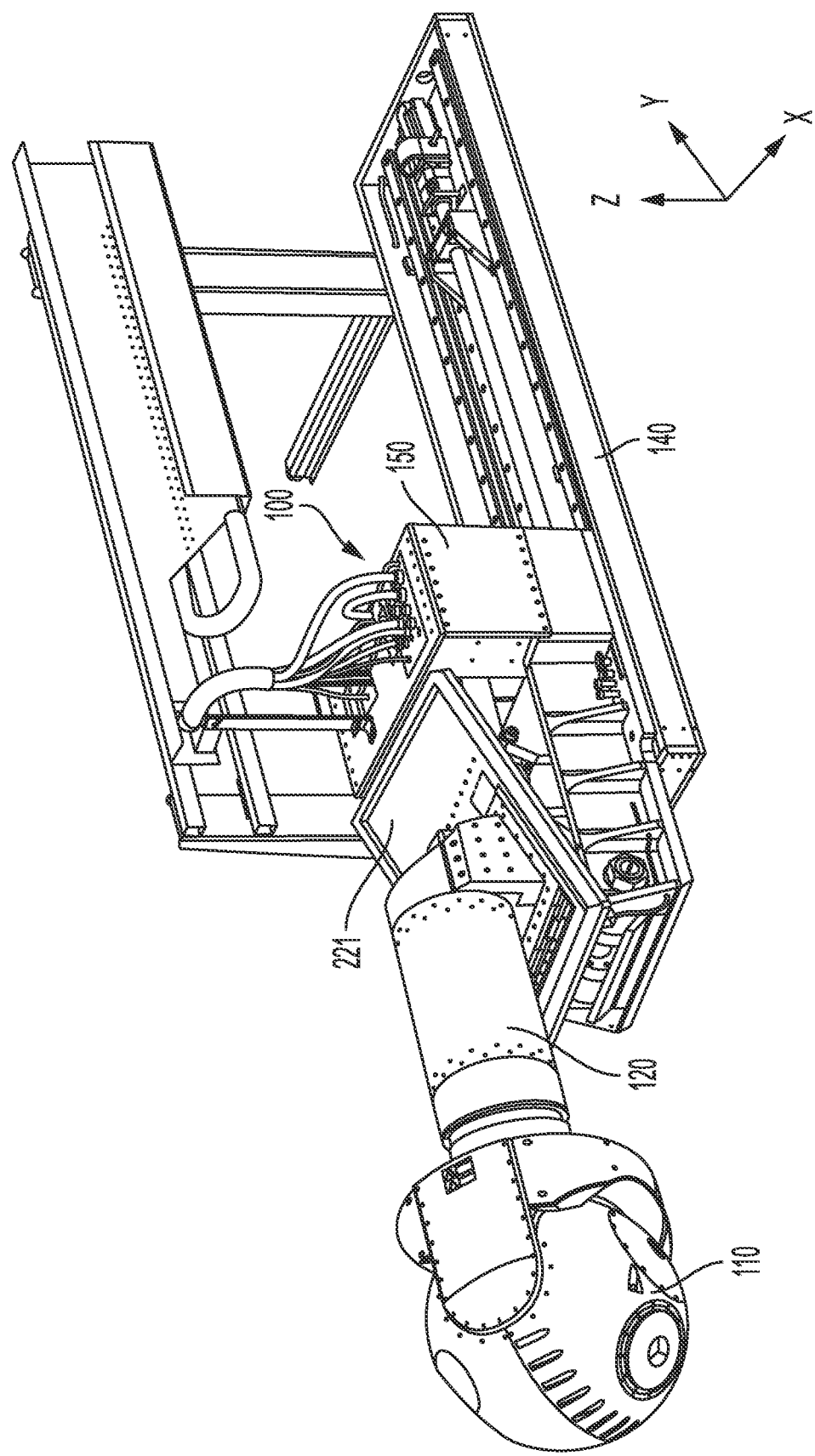
FIG. 7 is a perspective view of a sensor head, arm, and moveable carriage of a deployable sensor system in an intermediate position.
Figure 8:
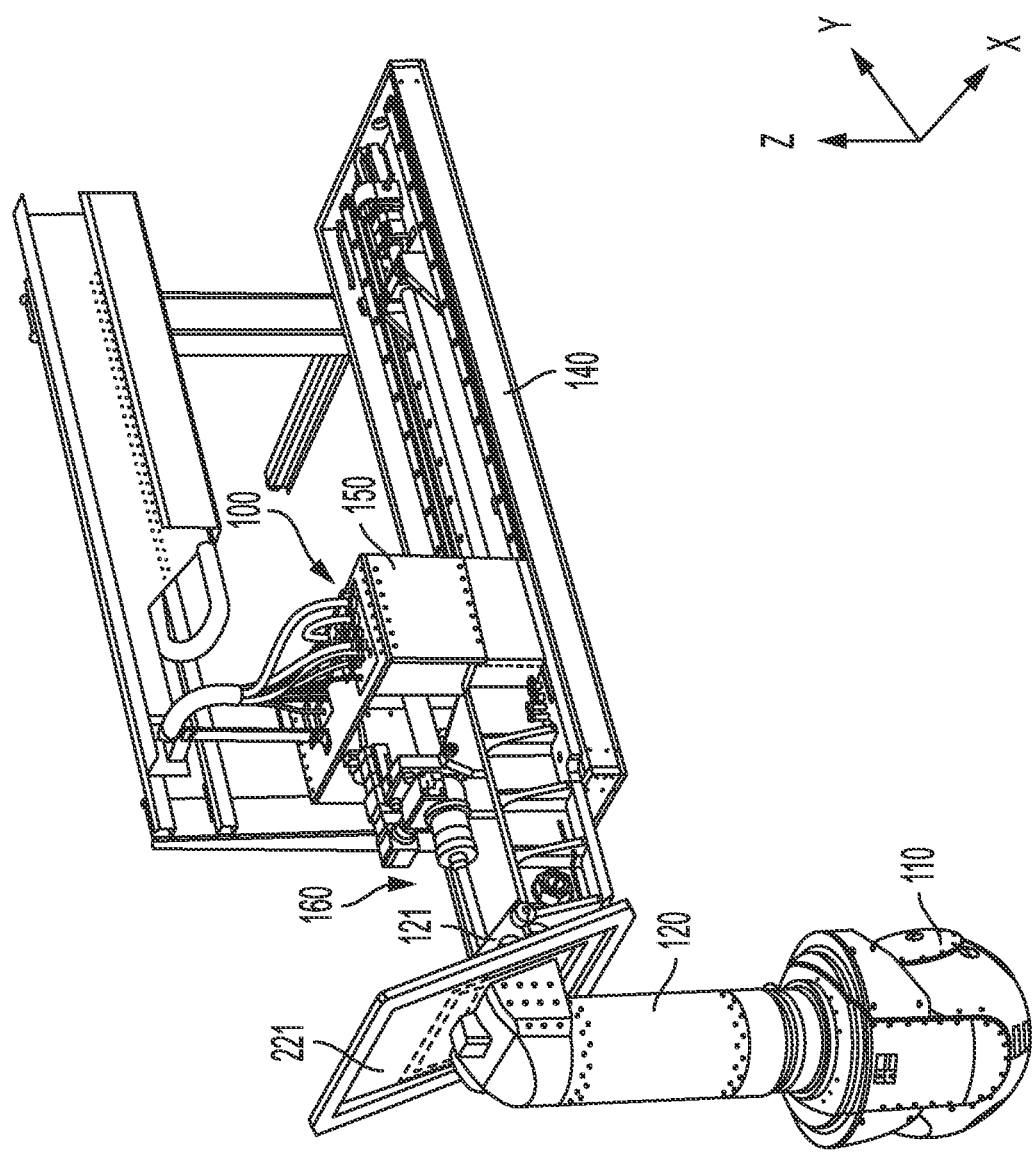
FIG. 8 is a perspective view of a sensor head, arm, and moveable carriage of a deployable sensor system in a fully deployed position.

Next, FIGS. 6-8 show the progressive movement of arm 120 and sensor head 110 from the stowed position (shown in FIG. 6), to an intermediate position (shown in FIG. 7), and ultimately to the fully deployed position (shown in FIG. 8) (all with certain elements of deployable sensor system 100 not shown for clarity). With reference to FIG. 6, in the stowed position, moveable carriage 150 is positioned so that the end of sensor head 110 is contained within the footprint of pallet 130 (i.e., with moveable carriage 150 positioned furthest toward the end of tray system 140 that is opposite door system 215). In this position, arm 120 is positioned so that a major axis extending through the length of arm 120 is generally parallel to the length of tray system 140. A door sealing panel 221 is mounted to pivot knuckle 121, which will seal an opening 217 in door system 215 when the deployable sensor system 100 is fully deployed. In the fully stowed position of FIG. 6, such door sealing panel 221 sits at an upward angle pointing away from door system 215, and will ultimately pivot to an upward angle pointing toward door system 215 as deployable sensor system 100 is deployed (as shown in FIG. 8). Next, and with reference to FIG. 7, during deployment of sensor head 110 to the exterior of the aircraft, moveable carriage 150 travels laterally (with respect to aircraft 200) along tray system 140 toward door system 215. Before advancing moveable carriage 150 toward door system 215, and with reference again to FIG. 3, hatch 220 (which fully seals door system 215 when deployable sensor system 100 is stowed and not in use) is opened to provide an opening 217 in the fuselage (sized to sealingly receive door sealing panel 221) that will allow sensor head 110 and arm 120 to pass through to the exterior of the aircraft. Finally, and with reference to FIG. 8, arm 120 and sensor head 110 are pivoted downward by pivot assembly 160, as pivot knuckle 121 carries door sealing panel 221 into alignment with and ultimately sealing of opening 217 in door system 215. In this position, sensor head 110 may be operated to collect the intended data from outside of aircraft 200.

Figure 9:
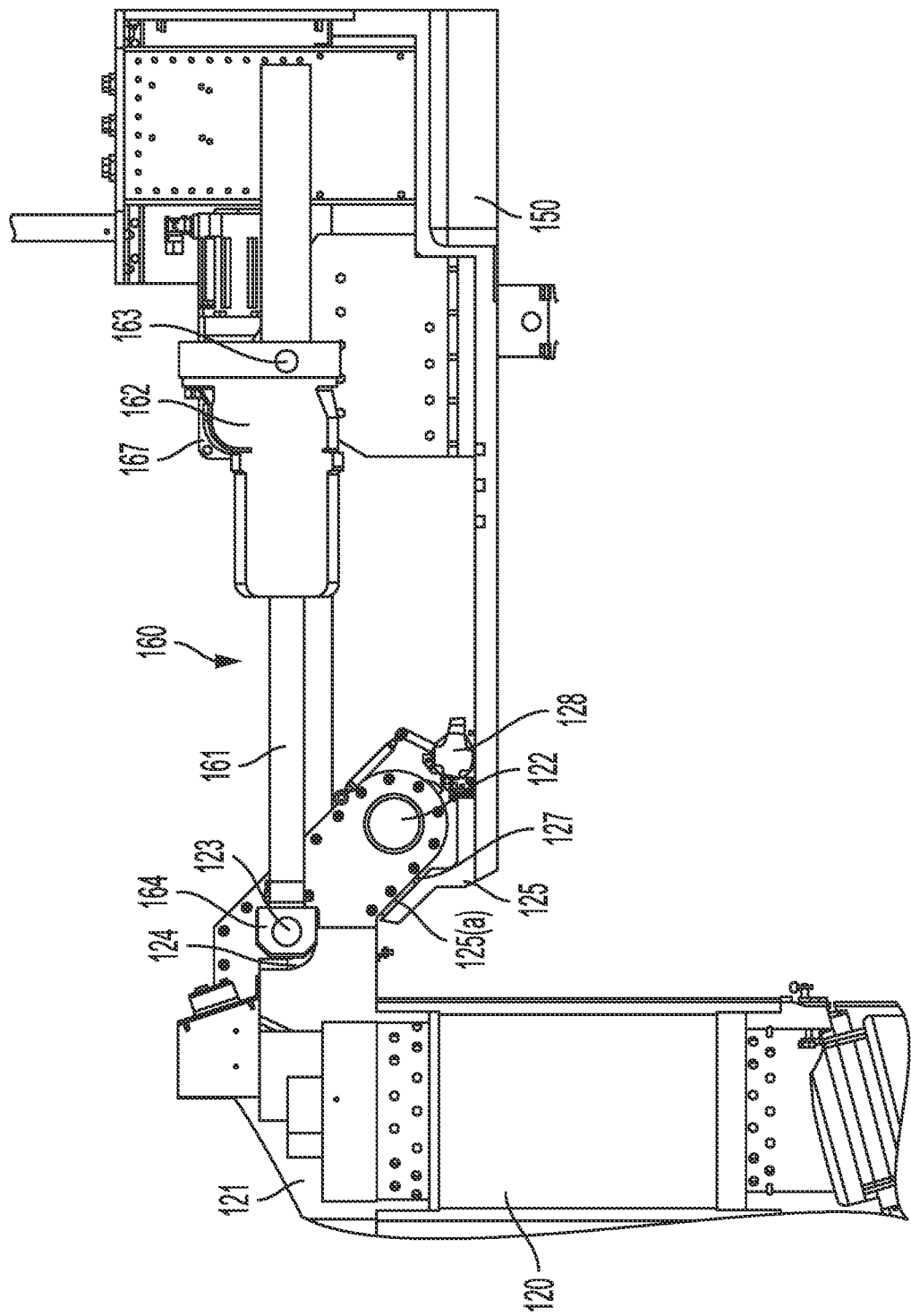
FIG. 9 is a close-up, rear, sectional view of the deployable sensor system.
Figure 10A:
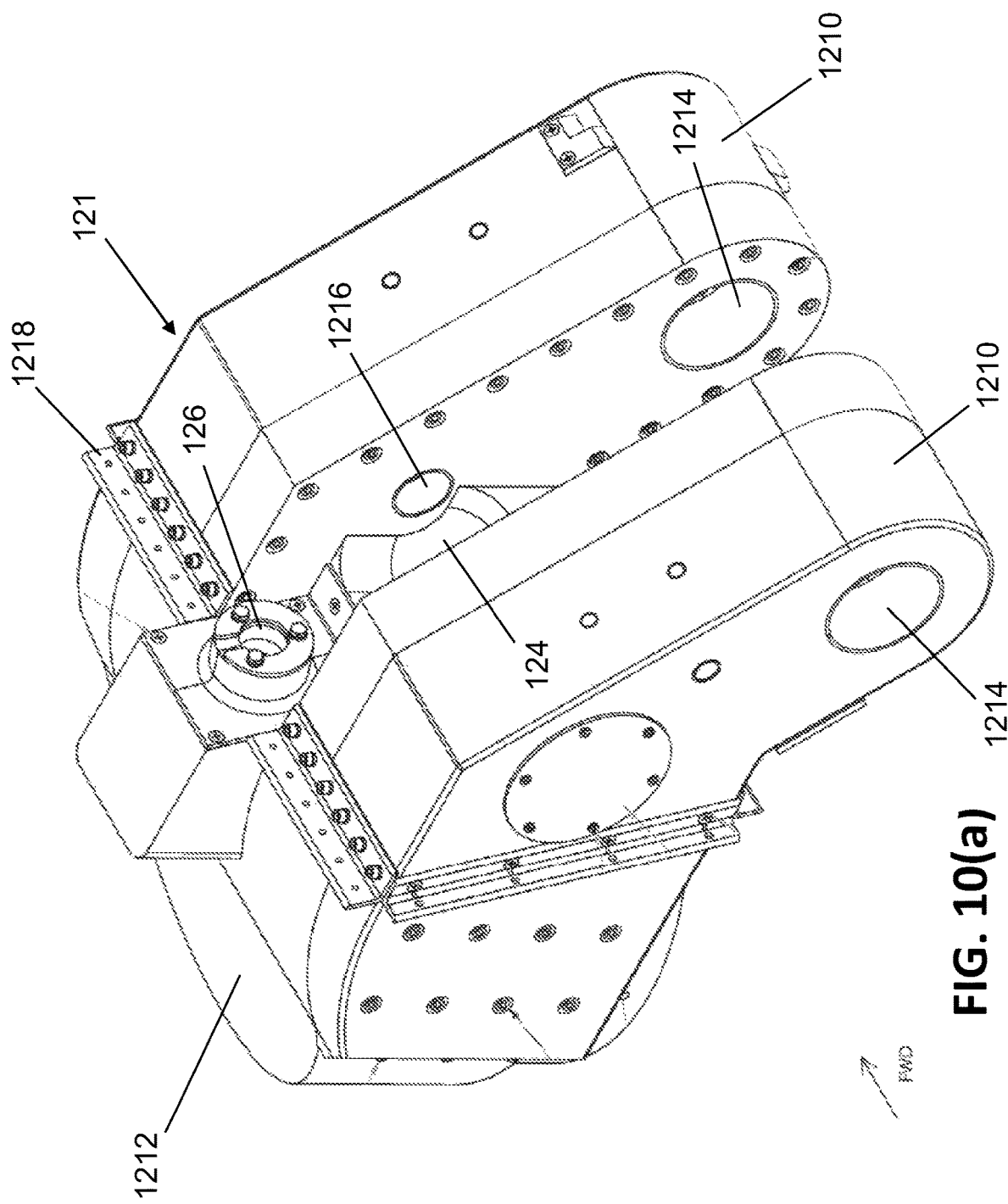
FIG. 10(a) is a close-up, perspective view of a knuckle for use in the deployable sensor system.
Figure 10C:
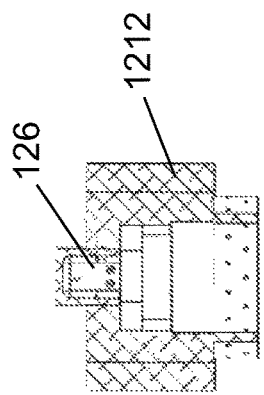
FIG. 10(c) is a cross-section view of the knuckle of FIG. 10(b) along section line C-C.
Figure 10B:
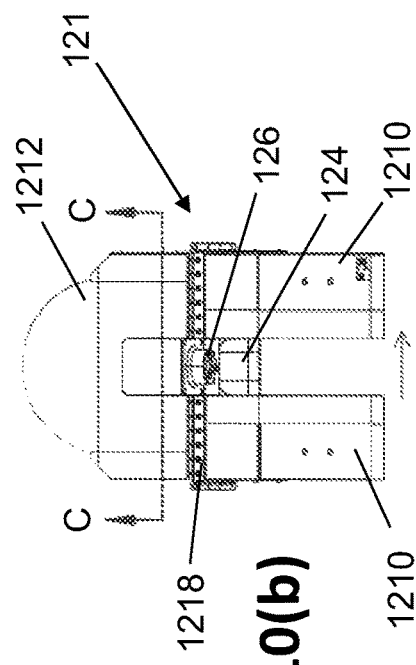
FIG. 10(b) is a top view of the knuckle of FIG. 10(a).
Figure 10F:
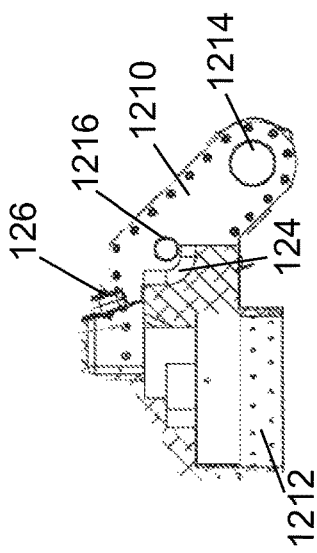
FIG. 10(f) is a cross-sectional view of the knuckle of FIG. 10(d) along section line E-E.
Figure 10D:
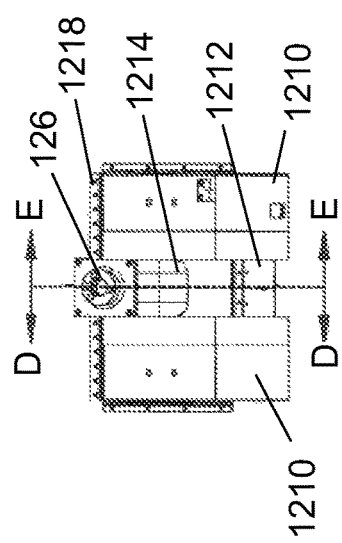
FIG. 10(d) is a side view of the knuckle of FIG. 10(a).
Figure 10E:
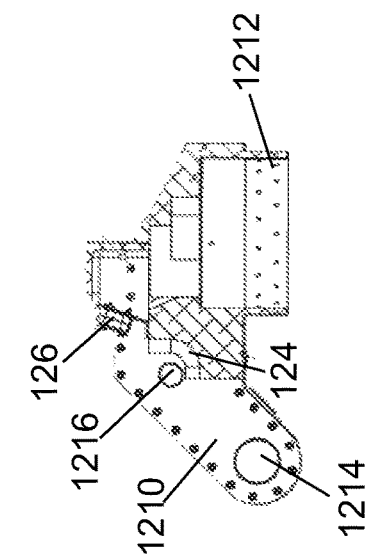
FIG. 10(e) is a cross-sectional view of the knuckle of FIG. 10(d) along section line D-D.

FIG. 9 shows a rear, cross-sectional view of pivot assembly 160 engaging pivot knuckle 121 to pivot and ultimately hold arm 120 and sensor head 110 in their fully deployed position outside of aircraft 200. Pivot assembly 160 includes a housing 162 that is pivotably mounted at pivot joint 163 to moveable carriage 150. Housing 162 preferably comprises a screw jack operated by a screw jack motor 167 (FIG. 4) that extends and retracts shaft 161. A shaft head 164 affixed to the distal end of shaft 161 pivotably attaches to pivot knuckle 121 at knuckle connector shaft 123. Shaft head 164 abuts a bottom portion of a curved notch 124 (having a complementary shape to shaft head 164) in pivot knuckle 121 when arm 120 and sensor head 110 are in the fully deployed position shown in FIG. 9. Pivot knuckle 121 is in turn pivotably mounted to moveable carriage 150 at knuckle shaft 122. Thus, as shaft 161 is extended, pivot knuckle 121 rotates about knuckle shaft 122, in turn causing arm 120 and sensor head 110 to be pivoted into their deployed positions shown in FIG. 9. In such fully deployed position, a bottom, forward edge 127 of pivot knuckle 121 comes in contact with a stop wedge 125 to stop further forward pivoting movement of pivot knuckle 121. As an added security measure, positioning switches 128 are preferably provided, such as (by way of non-limiting example) limit switches, crash switches, encoders, and the like, to ensure proper positioning and orientation of arm 120 and sensor 110 in their fully deployed positions.

FIGS. 10(*a*) through 10(*f*) show various close-up views of knuckle 121. Knuckle 121 includes arms 1210 that pivotably mount main body 1212 to moveable carriage 150, which main body 1212 receives the top (or proximal) end of arm 120. A bottom end of arms 1210 includes openings 1214 that receive knuckle shaft 122. An upper end of arms 1210 include openings 1216 that receive knuckle connector shaft 123 (joining knuckle 121 to shaft head 164 of shaft 161). Curved notch 124 sits between arms 1210 and provides a point of contact with the outer face of shaft head 164 as knuckle 121 is rotated from the stowed position to the deployed position. A cable pass-through 126 is situated at the top of main body 1212 of knuckle 121, allowing electrical cables (not shown) to pass from instrumentation and control consoles 300 ultimately into arm 120 and sensor head 110, all while keeping a tight seal so as to maintain pressurization within the aircraft. A flange 1218 extends around knuckle 121 at the interface of arms 1210 and main body 1212, which flange 1218 provides a mounting surface for door sealing panel 221 so as to carry door sealing panel 221 into its closed and sealed position upon full deployment of knuckle 121.

Figure 11:
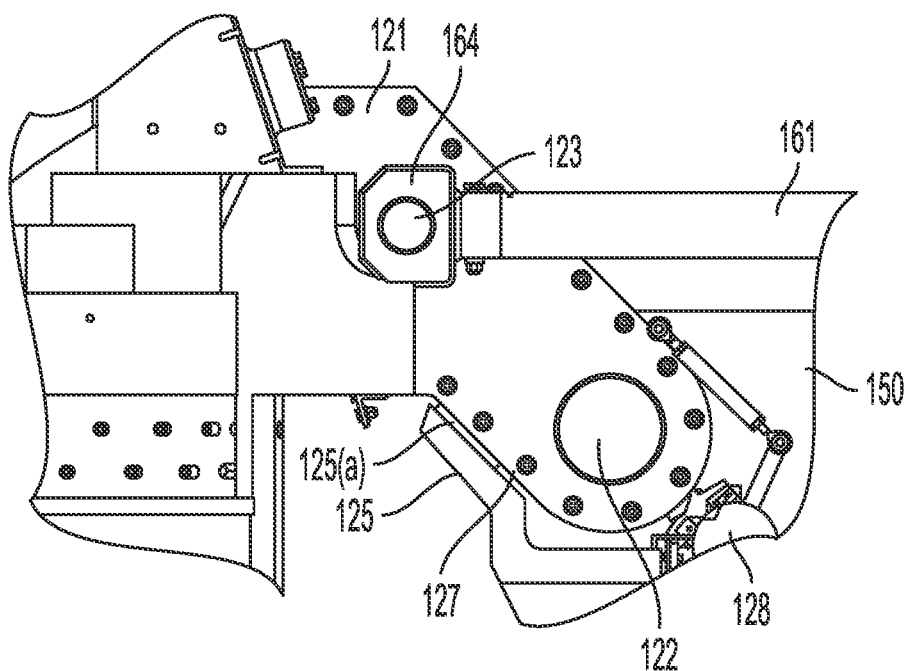
FIG. 11 is a close-up, sectional view of a connection between a knuckle and arm of a pivot assembly for use in the deployable sensor system.
Figure 12:
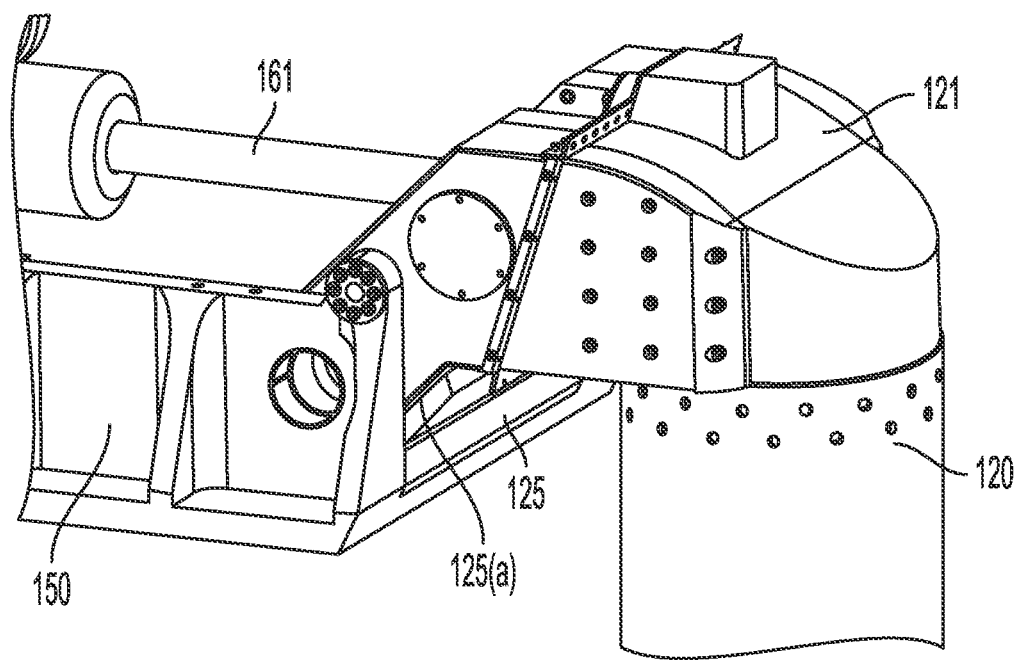
FIG. 12 is a close-up, perspective view of a knuckle and forward end of a moveable carriage for use in the deployable sensor system.

FIGS. 11 and 12 show close-up sectional and perspective views, respectfully, of the connection between knuckle 121 and arm 161. As shown in FIG. 11, deployable sensor system 100, in accordance with certain features of a particular embodiment, may be configured with a 3-point contact on knuckle 121, which 3-point contact prevents the natural frequency of the arm 120 and sensor head 110 assembly from dropping below 20 Hz, and thus maintaining an optimal operational environment for sensor head 110 when it is deployed and collecting data. More particularly, when fully deployed, knuckle 121 is compressed between the pressure of screw jack shaft 161 (and specifically shaft head 164) and stop wedge 125. Optionally, a sacrificial plate 125(*a*) may be situated between stop wedge 125 and knuckle 121, which for instance may be formed from lower grade aluminum, and thus easily able to be replaced periodically on an as-needed basis without significant cost or effort. In such configuration, during the pivoting of knuckle 121 toward its fully deployed position, a controller slows the knuckle 121 as it approaches sacrificial plate 125(*a*). Limit switch 128 completely stops knuckle 121 from further movement toward the deployed position when knuckle 121 contacts sacrificial plate 125(*a*). This configuration provides the 3-point contact on knuckle 121 without adding significant force on stop wedge 125 on moveable carriage 150, again providing the deployable sensor system 100 a natural frequency that will not drop below 20 Hz. Those three points of contact thus include: (i) the main pivot (knuckle shaft 122 joining knuckle 121 to moveable carriage 150); (ii) knuckle connector shaft 123 joining screw jack shaft 161 (and more particularly head 164 of shaft 161) to knuckle 121 (rotating about a PTFE bushing); and (iii) stop wedge 125, or sacrificial plate 125(*a*) if provided. If knuckle 121 is moved beyond the position allowed by limit switch 128, a crash switch may additionally be provided which would activate at that point to avoid damage to stop wedge 125.

Figure 13:
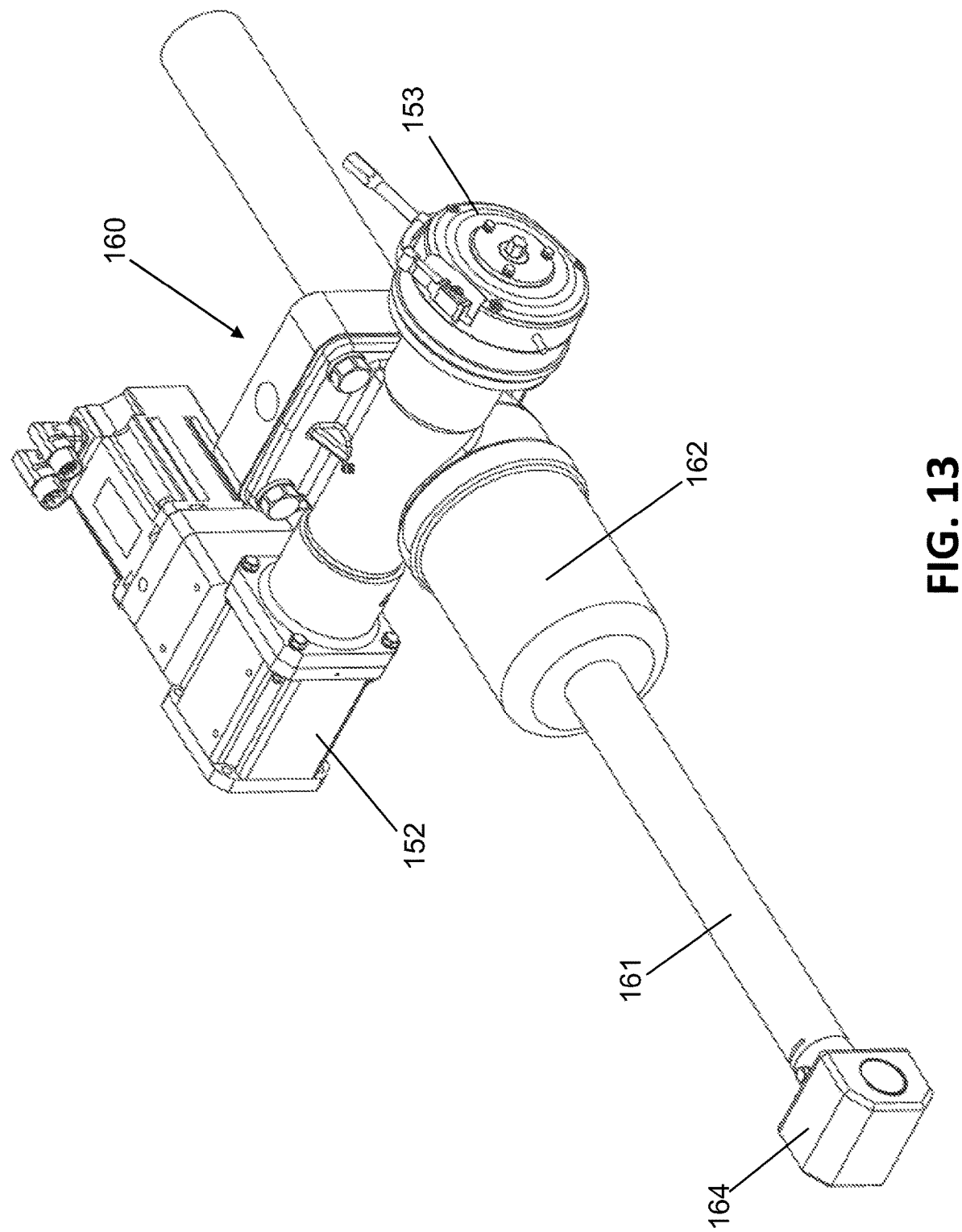
FIG. 13 is a perspective view of a pivot assembly for use in the deployable sensor system.
Figure 14:
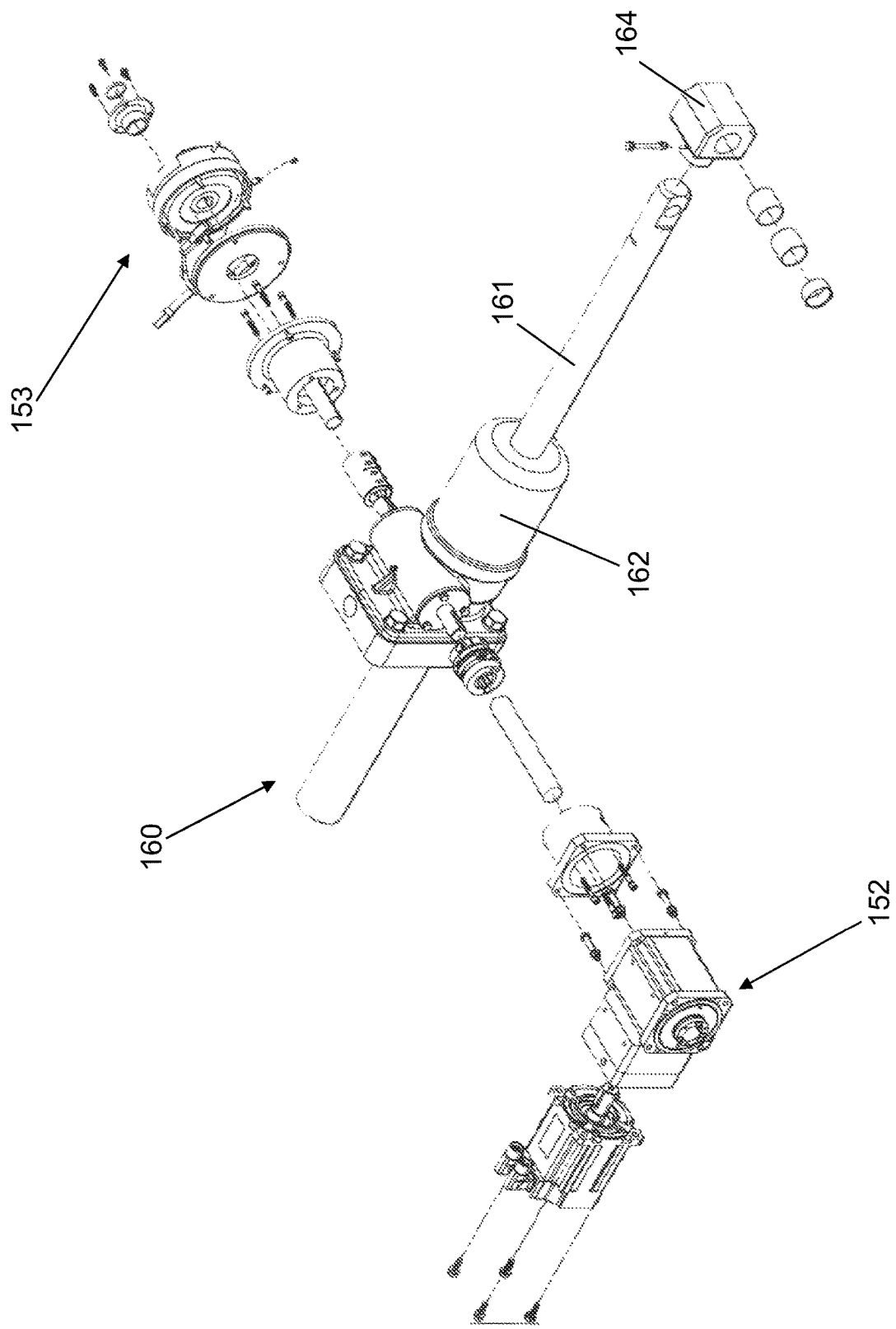
FIG. 14 is an exploded view of the pivot assembly of FIG. 13.
Figure 15:
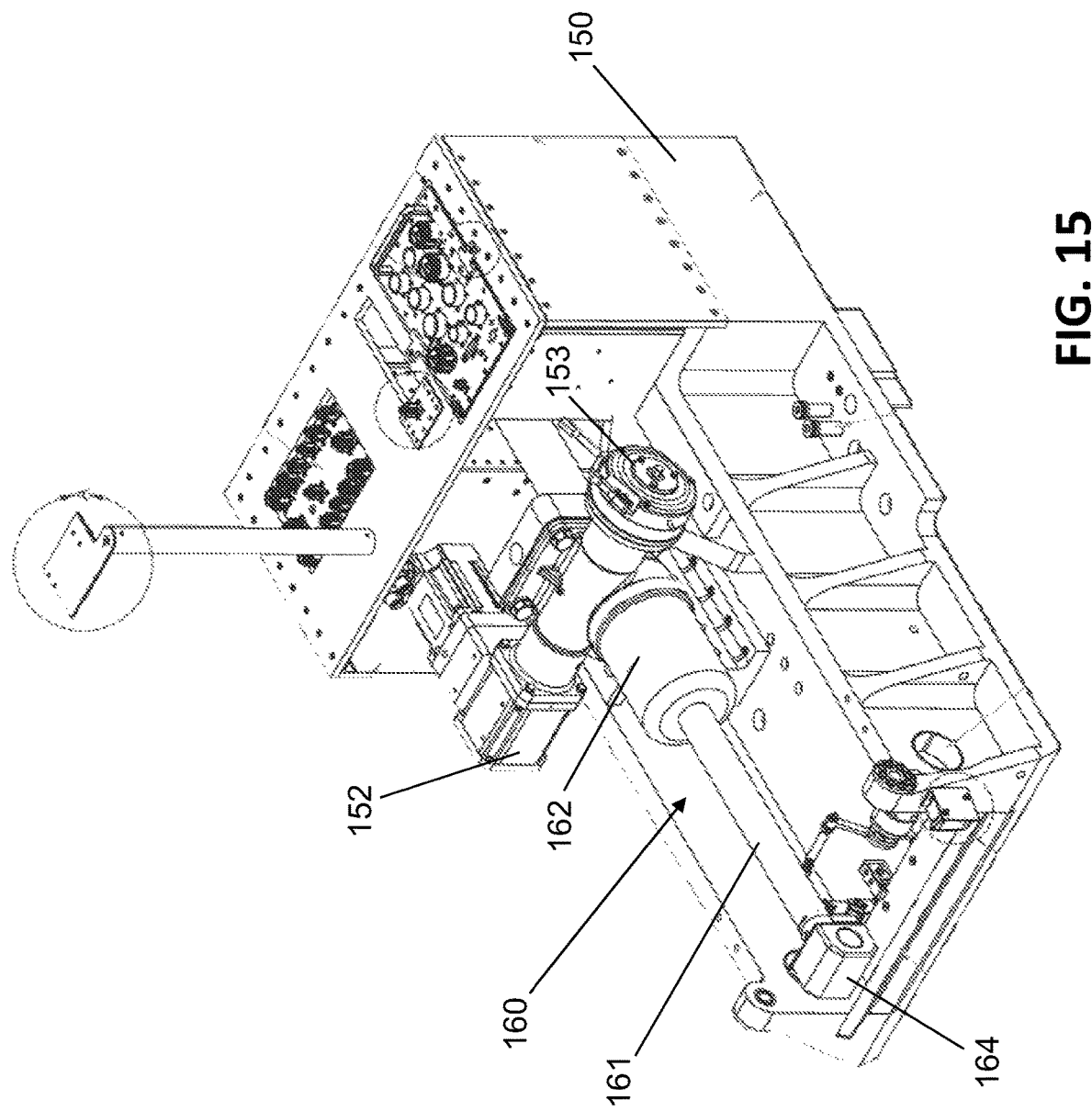
FIG. 15 is a perspective view of the pivot assembly of FIG. 13 positioned in a moveable carriage for use in the deployable sensor system.
Figure 16:
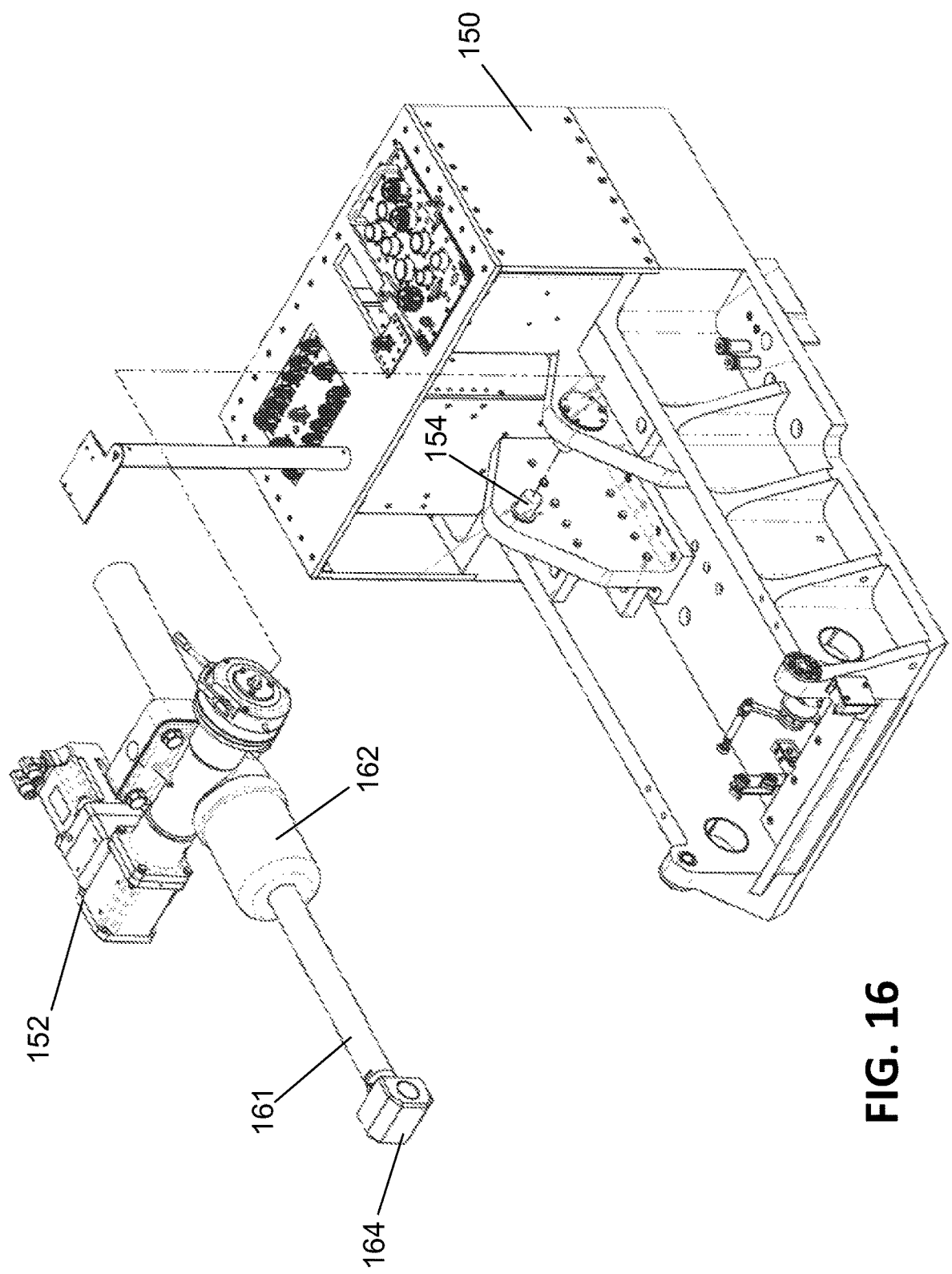
FIG. 16 is a partially exploded view of the pivot assembly and moveable carriage of FIG. 15.

FIG. 13 provides a close-up perspective view, and FIG. 14 an exploded view, of pivot assembly 160. As shown in FIGS. 13 and 14, motor 152 powers screw jack shaft 161 to extend shaft 161 (and shaft head 164) from housing 162, and likewise to retract shaft 161. A brake assembly 153 is also provided that disengages motor 152 from screw jack shaft 161, thus allowing manual movement of knuckle 121 for manual pivoting of arm 120 and sensor head 110. FIG. 15 provides a perspective, detail view of pivot assembly 160 mounted on moveable carriage 150, and FIG. 16 provides a partially exploded view of the same. As shown in FIG. 16, moveable carriage 150 includes mounting pins 154 which pivotably receive pivot assembly 160, thus allowing pivotable movement of shaft 161 as arm 120 is pivoted from the stowed to the deployed positions.

Figure 19:
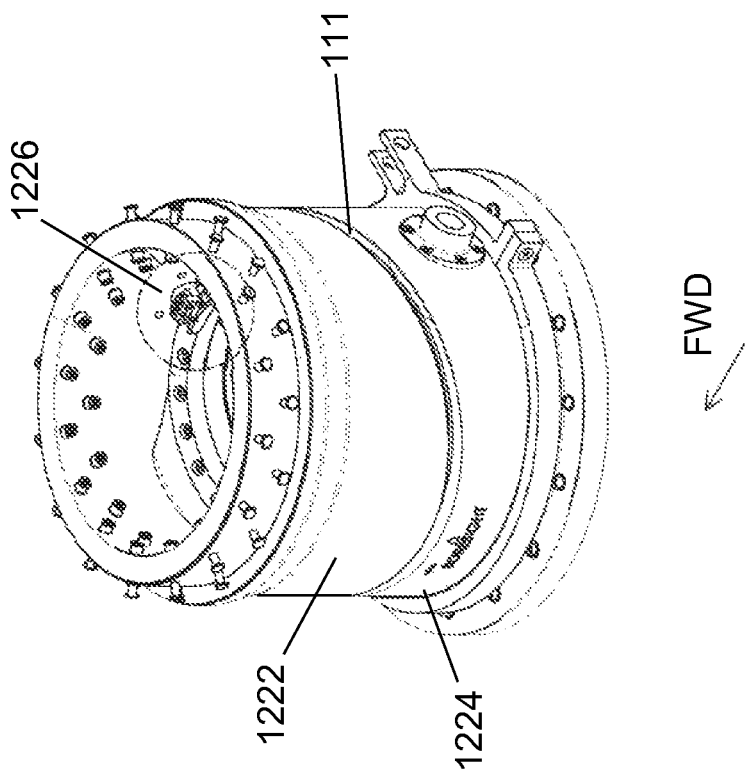
FIG. 19 is a close-up perspective view of an upper collar and lower collar for use in the arm of FIGS. 17 and 18.
Figure 17:
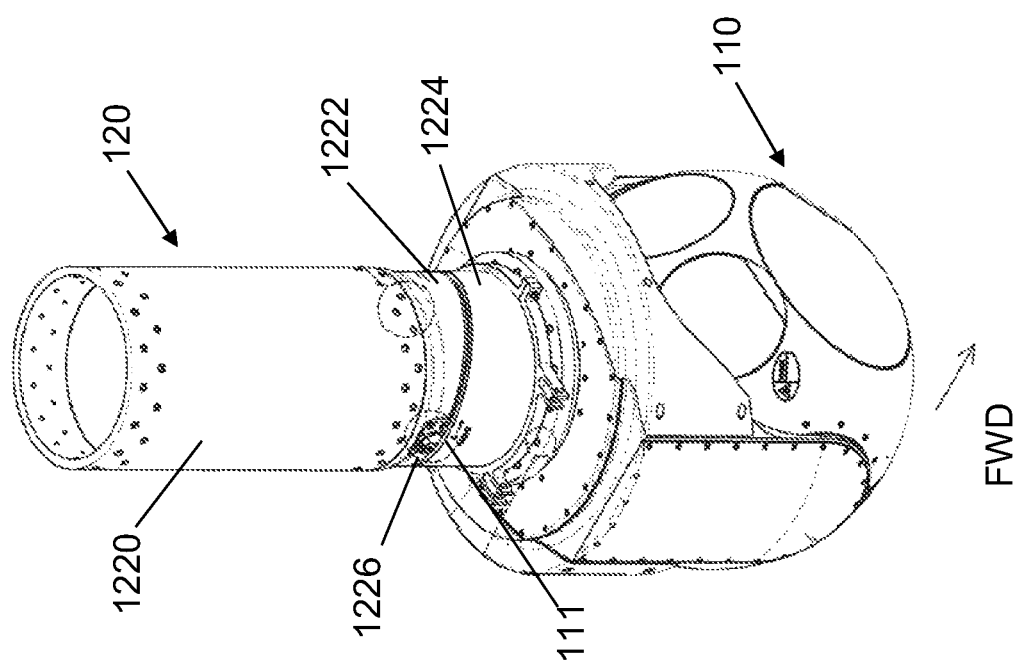
FIG. 17 is a perspective view of an arm and sensor head for use in the deployable sensor system.
Figure 18:
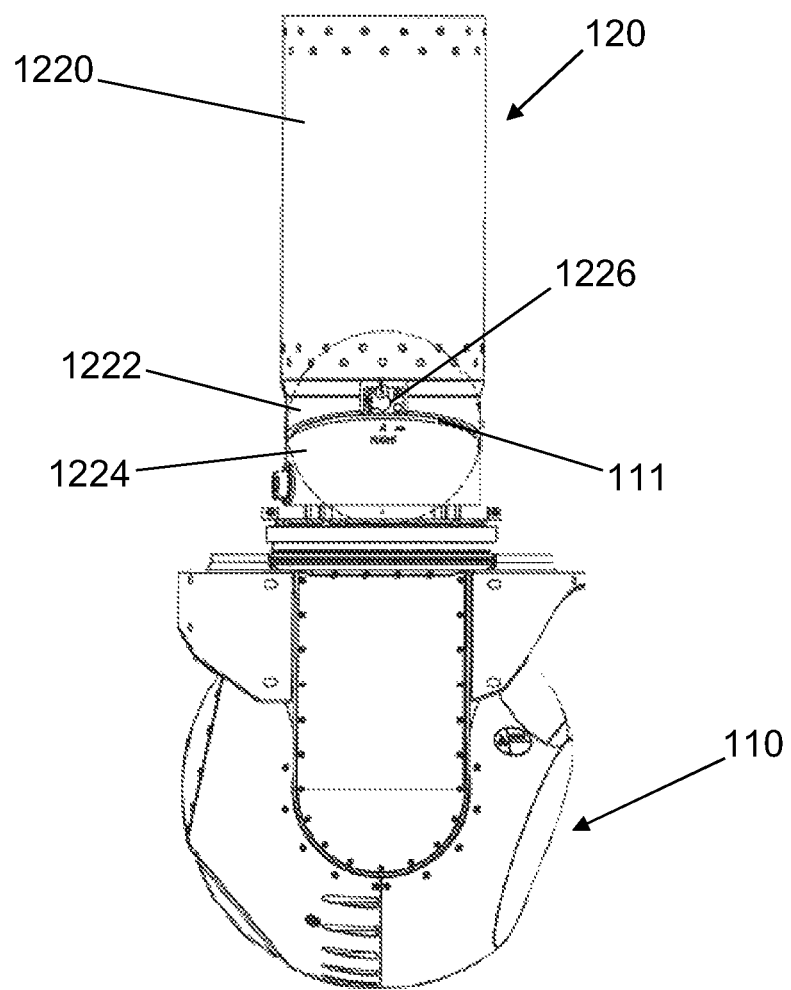
FIG. 18 is a side view of the arm and sensor head of FIG. 17.
Figure 20:
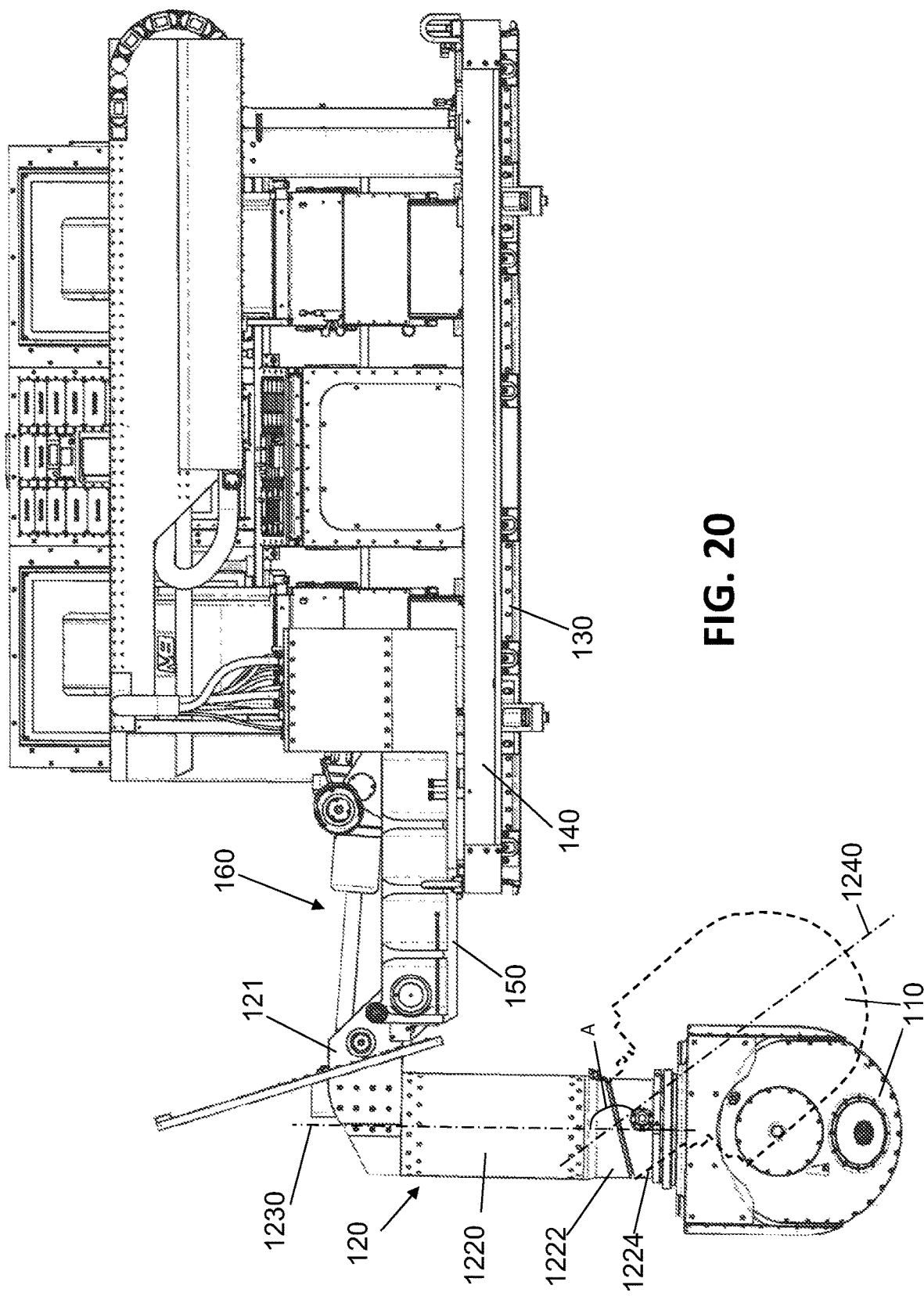
FIG. 20 is a rear view of the deployable sensor system showing various positions of a sensor head upon rotation of the sensor head with respect to an arm of the deployable sensor system.

Next, FIG. 17 shows a perspective view, and FIG. 18 a side view, of arm 120 and sensor head 110. Arm 120 includes a main shaft 1220 having an upper rim that attaches to main body 1212 of knuckle 121, such as by way of threaded connectors such as standard bolts. At the bottom of main body 1212, arm 120 includes an upper collar 1222, and a lower collar 1224. Lower collar 1224 is rotatably mounted to upper collar 1222 along an angled interface 111 (best shown in the close-up view of FIG. 19). Sensor head 110, in turn, is affixed to lower collar 1224, such as by way of threaded connectors such as standard bolts. A latch 1226 locks the position of lower collar 1224 with respect to upper collar 1222 to prevent relative rotation between them. However, as shown in FIG. 20, when latch 1226 is open, lower collar 1224 may be manually rotated with respect to upper collar 1224 along angled interface 111. Because the interface between upper collar 1222 and lower collar 1224 is angled, such rotation causes lower collar 1224 and sensor head 110 to change their linear orientation with respect to main shaft 1220 of arm 120, thus creating an angular offset A between a first axis 1230 extending through main shaft 1220 and upper collar 1222, and a second axis 1240 extending through lower collar 1224 and sensor head 110. Such configuration is useful for bore-sighting instrumentation positioned within sensor head 110.

More particularly and as mentioned above, arm 120 and sensor head 110 are provided a sufficient length so that when they are in their fully deployed position outside of the aircraft, sensor head 110 extends preferably below the bottom of the fuselage of the aircraft to provide a maximized field of view. Of course, when the aircraft is positioned on the ground, such full deployment of arm 120 and sensor head 110 would not be possible, as lowering sensor head 110 toward that fully deployed position would cause it to impact the ground surface on which the grounded aircraft is located. However, vertical orientation of at least sensor head 110 is desirable when the aircraft is on the ground to allow bore-sighting of the sensors within sensor head 110. Thus, when aircraft 200 is positioned on the ground, arm 120 and sensor head 110 may be extended out of the aircraft's fuselage as detailed above, and particularly to the intermediate position shown in FIG. 7. At this point, arm 120 and sensor head 110 may be moved by pivot assembly 160 only partially toward the fully deployed position, and preferably to a position in which the first axis 1230 extending through main shaft 1220 of arm 120 and second axis 1240 extending through sensor head 110 (being collinear) are positioned at approximately 60° degrees to horizontal. In this position, latch 1226 may be released, and sensor head 110 may be pivoted (by rotating lower collar 1224 with respect to upper collar 1222) so that second axis 1240 is vertically aligned while first axis 1230 remains angled with respect to horizontal. In this intermediately deployed position, the bottom of sensor head 110 is positioned vertically above what its position would otherwise be if lower collar 1224 had not been rotated with respect to upper collar and the entire assembly of arm 120 and sensor head 110 were in their fully deployed positions. In such position with sensor head 110 now vertically aligned but with its bottom edge above the surface of the ground, instruments within sensor head 110 may be bore sighted to a fixed, ground-based target, vastly simplifying the bore-sighting process from those that must be carried out during airborne operations.

Figure 21:
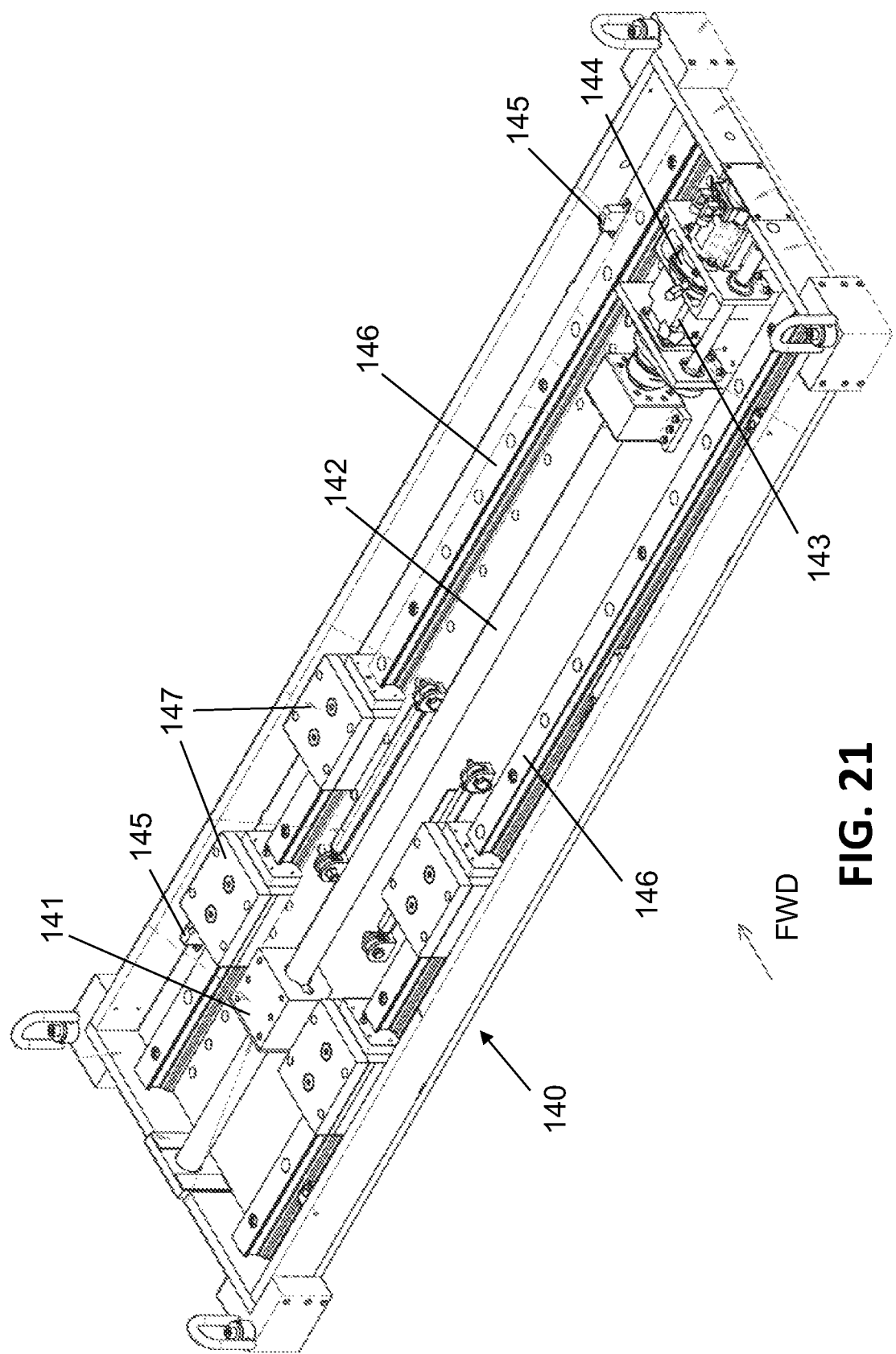
FIG. 21 is a perspective view of a tray system for use in the deployable sensor system.
Figure 22:
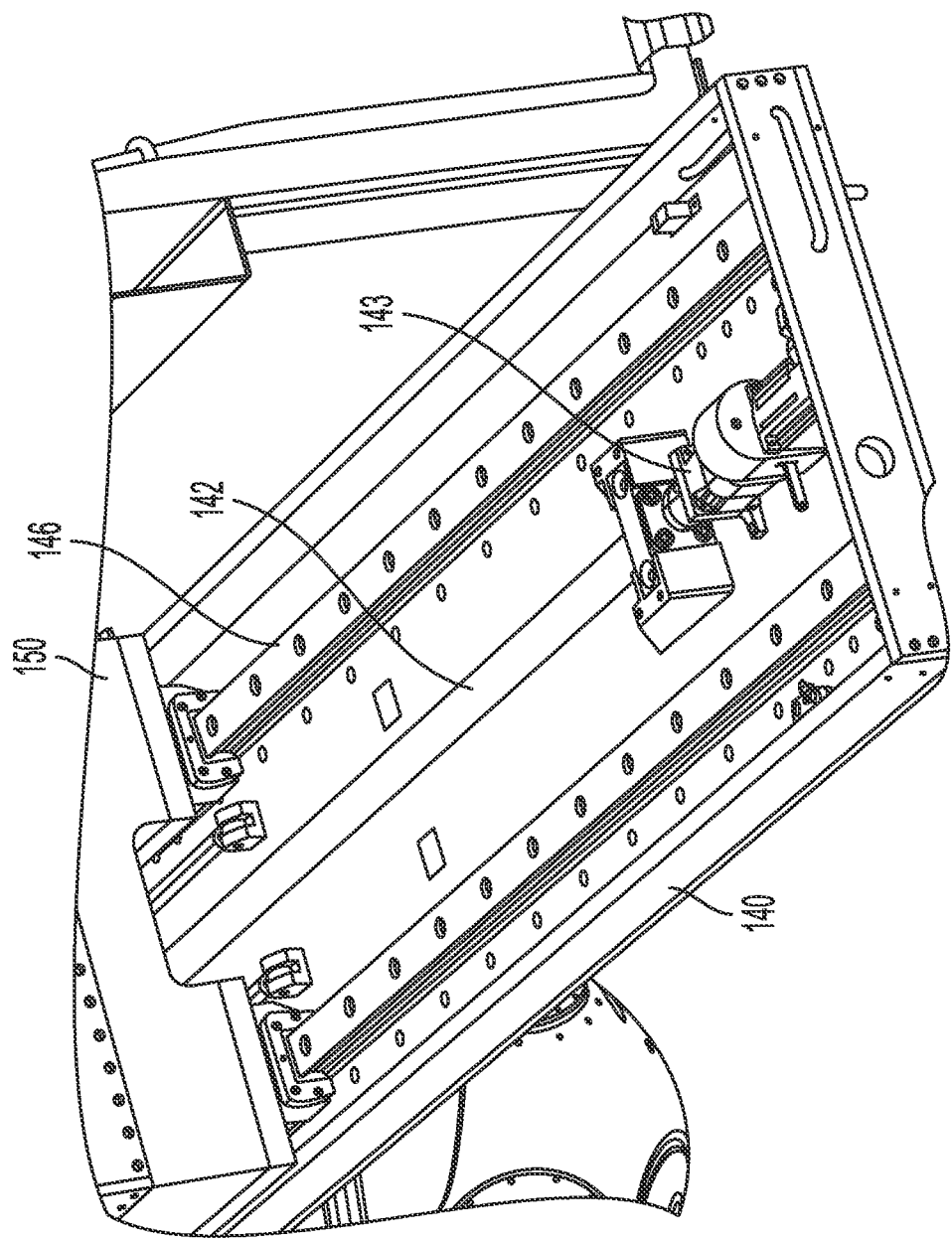
FIG. 22 is another perspective view of the tray system of FIG. 21 and including a moveable carriage of the deployable sensor system.

Next, FIG. 21 provides a detail perspective view of tray system 140. As mentioned above and with reference to both FIGS. 21 and 22, tray system 140 moveably mounts moveable carriage 150 for lateral movement with respect to pallet 130 on which tray system 140 is mounted. More particularly, moveable carriage 150 engages a drive assembly 141 that moves along screw 142, which screw 142 in turn is driven by motor assembly 143 on tray system 140. Moveable carriage 150 is also preferably mounted to guide blocks 147 that slide along guide rails 146. Motor assembly 143 includes a brake 144 that, as above, allows disengagement of motor assembly 143 from screw 142, thus allowing manual movement of moveable carriage 150 with respect to tray system 140 when necessary. Tray system 140 preferably has a length that matches the width dimension of pallet 130, and thus extends from one side to the other of pallet 130 at the back end of pallet 130. Limit switches 145 are provided and configured to automatically terminate movement of moveable carriage 150 when it reaches the designated limit positions. FIG. 22 provides a perspective view of tray system 140 with moveable carriage 150 moved along rails 146 to its deployed position.

Figure 23:
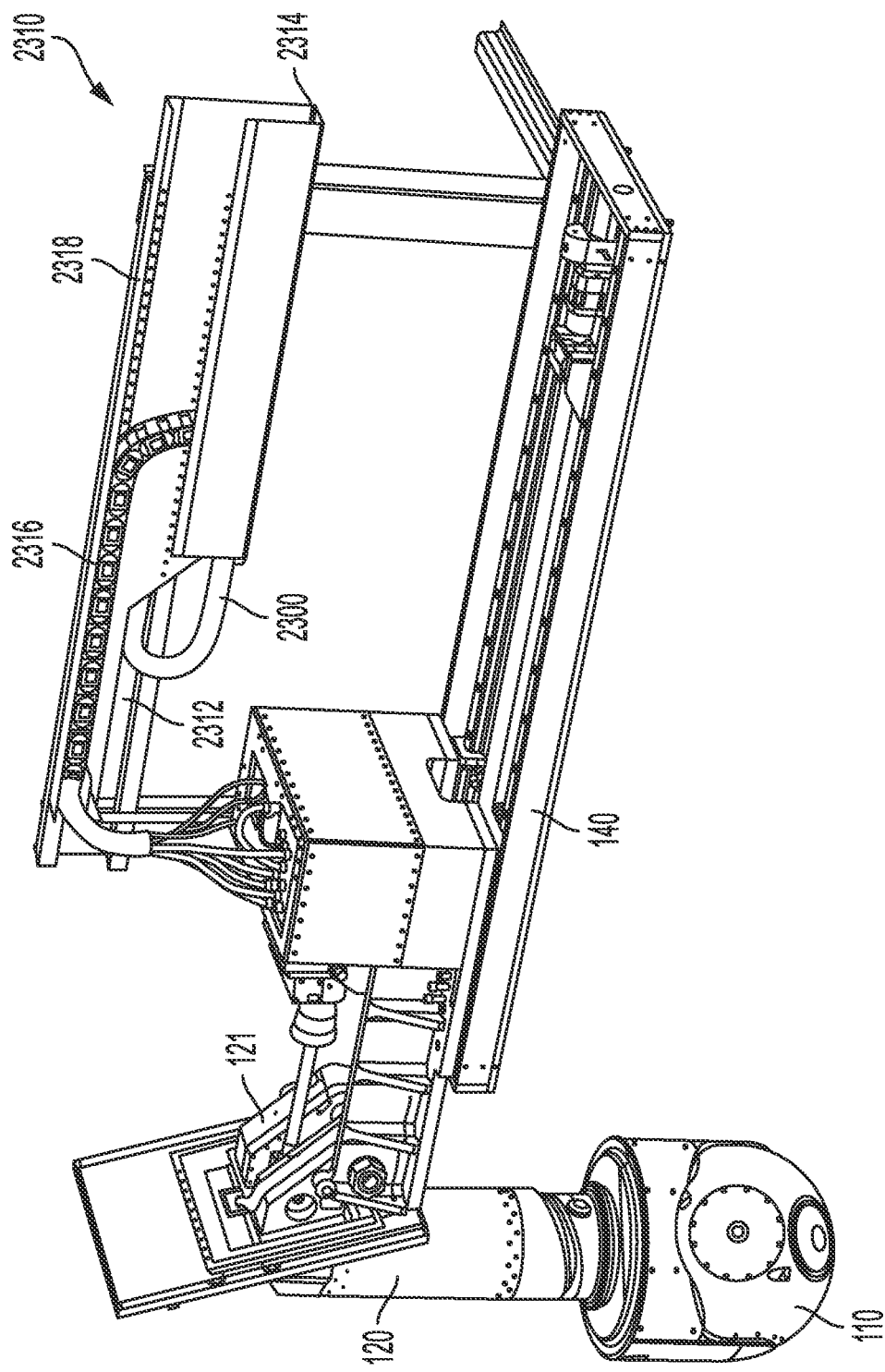
FIG. 23 is a perspective view of the deployable sensor system of FIG. 1 including details of a wire guide.
Figure 24:
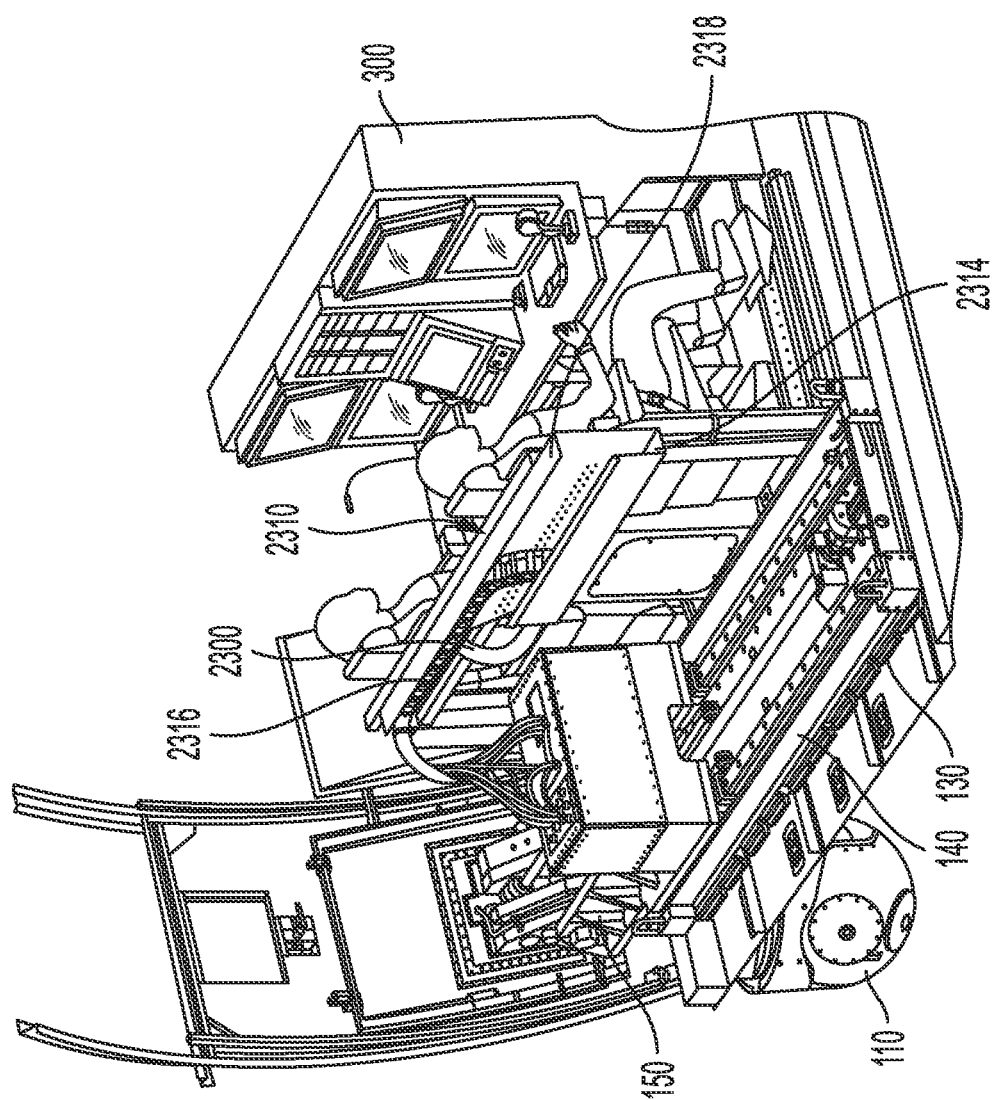
FIG. 24 is a perspective view of the deployable sensor system of FIG. 1 including details of the wire guide of FIG. 23 and positioning of the deployable sensor system with respect to the interior of an aircraft.

FIG. 23 shows a perspective view of a wire guide 2310 with moveable carriage 150 having moved sensor head 110 and arm 120 to the deployed positions, such that moveable carriage 150 is positioned at a limit end of tray system 140. FIG. 24 shows a perspective view wire guide 2310 with the full deployable sensor system 100 in the same position as FIG. 23. As shown in FIGS. 23 and 24, control cables 2300

(interconnecting the electronics of carriage 150, and ultimately of sensor head 110, with control electronics of instrumentation and control consoles 300, as shown in FIG. 1) are routed from instrumentation and control consoles 300 through a wire guide (shown generally at 2310) that controls the path of control cables 2300 between instrumentation and control consoles 300 and moveable carriage 150 as moveable carriage 150 moves along tray system 140. Wire guide 2310 includes a window 2312 that receives cables 2300 from the console side of deployable sensor system 100 and directs them toward a lower channel 2314 on wire guide 2310. A chain assembly 2316 comprised of rigid, hollow links receive and carries cables 2300 therein. Chain assembly 2316 has a first end positioned within lower channel 2314, and chain assembly 2316 curves upward toward and is retained by an upper chain guide 2318, with a second end of chain assembly 2316 being positioned adjacent upper chain guide 2318. From that second end of chain assembly 2316, cables 2300 are directed downward toward moveable carriage 150. With this configuration, as moveable carriage moves toward the deployed position shown in FIGS. 23 and 24, the path of cables 2300 is contained within chain assembly 2316, which itself is contained between lower channel 2314 and upper chain guide 2318 of wire guide 2310, in turn maintaining all such control cables 2300 cleanly deployable and stowable throughout all movement of moveable carriage 150.

As shown throughout the figures, door system 215 is configured for easy movement from the closed position (shown in FIG. 3) to the open position via pivoting mounting arms 222, which cause the aircraft door to swing both inward and to the side when the door is pulled. Once the door is opened and the system 100 is deployed, door sealing panel 221 seals the opening left by open door system 215.

Those skilled in the art will recognize that the foregoing offers a modular, palletized system for a deployable sensor that provides for easy deployment with minimal interconnection to the vehicle carrying such system, and with no requirement for modification to the vehicle carrying such system. The system is configured so that it is hidden from sight when the vehicle, and more particularly an aircraft, carrying such system is not in use—such as when such aircraft is on the ground, taking off, or landing, thus aiding in maintaining security during covert operations. As a palletized system, it may be easily positioned on an aircraft when desired simply through loading as any other pallet would be loaded on the aircraft, thus allowing easy installation without modification to the aircraft body.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A deployable sensor system, comprising:
a pallet;
a moveable carriage moveably mounted on said pallet;
an arm having a first arm end adjacent said moveable carriage and a second arm end opposite said first arm end and defining a longitudinal axis extending from said first arm end toward said second arm end, said arm further comprising an upper collar having a first angled face and a lower collar having a second angled face mating with said first angled face; and
a sensor head rotatably mounted to said second arm end and defining a second longitudinal axis extending from said second angled face to a distal end of said sensor head;
wherein said sensor head is rotatable with respect to said arm to change an orientation of said first and second longitudinal axes from collinear to angled.

2. The deployable sensor system of claim 1, further comprising a knuckle pivotably mounted to said moveable carriage, wherein said first arm end is affixed to said knuckle.

3. The deployable sensor system of claim 2, further comprising a door sealing panel affixed to and moveable with said knuckle.

4. The deployable sensor system of claim 2, said moveable carriage further comprising a pivot assembly having a housing pivotably mounted to said moveable carriage and an extensible shaft extending from said housing and pivotably connected to said knuckle.

5. The deployable sensor system of claim 4, wherein extension of said shaft pivots said knuckle, arm, and sensor head with respect to said moveable carriage.

6. The deployable sensor system of claim 4, further comprising a shaft head at a distal end of said shaft, said shaft head engaging a reaction surface on said knuckle.

7. The deployable sensor system of claim 6, wherein said reaction surface further comprises a curved notch on said knuckle.

8. The deployable sensor system of claim 6, further comprising a stop wedge at an end of said moveable carriage and positioned to apply force to said knuckle when said knuckle, said arm, and said sensor head are in a fully deployed position.

9. The deployable sensor system of claim 8, wherein at least said shaft head, said reaction surface on said knuckle, and said stop wedge are configured to provide said sensor head and said arm a natural frequency of at least 20 Hz when said sensor head and said arm are in a deployed position.

10. The deployable sensor system of claim 1, further comprising a manually operable latch locking rotation of said lower collar with respect to said upper collar.

11. The deployable sensor system of claim 1, further comprising a tray system affixed to said pallet, wherein said moveable carriage is movably mounted in said tray system.

12. The deployable sensor system of claim 11, wherein said tray system extends across an entire width of said pallet.

13. The deployable sensor system of claim 11, wherein said pallet is configured for attachment to an interior deck of an aircraft, and wherein said moveable carriage is positioned for movement toward and away from a door in a fuselage of the aircraft.

14. The deployable sensor system of claim 11, further comprising a wire guide positioned adjacent a side edge of said tray system.

15. The deployable sensor system of claim 14, further comprising a chain positioned for movement within said wire guide, said chain carrying control cables and guiding a path of said control cables from a control console to the moveable carriage as the moveable carriage moves along the tray system.

16. The deployable sensor system of claim 15, wherein said control console is affixed to said pallet.

* * * * *